(12) United States Patent
Tanaka

(10) Patent No.: US 12,118,747 B2
(45) Date of Patent: Oct. 15, 2024

(54) GAZE DETECTION APPARATUS

(71) Applicant: CANON KABUSHIKI KAISHA, Tokyo (JP)

(72) Inventor: Shu Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 18/064,084

(22) Filed: Dec. 9, 2022

(65) Prior Publication Data
US 2023/0186520 A1 Jun. 15, 2023

(30) Foreign Application Priority Data
Dec. 13, 2021 (JP) .................. 2021-201724

(51) Int. Cl.
| | |
|---|---|
| G06T 7/80 | (2017.01) |
| G06F 3/01 | (2006.01) |
| G06V 10/82 | (2022.01) |
| G06V 40/16 | (2022.01) |

(Continued)

(52) U.S. Cl.
CPC ............... *G06T 7/80* (2017.01); *G06F 3/012* (2013.01); *G06F 3/013* (2013.01); *G06V 10/82* (2022.01); *G06V 40/161* (2022.01); *G06V 40/18* (2022.01); *H04N 23/611* (2023.01); *G06T 2207/20084* (2013.01); *G06T 2207/30201* (2013.01)

(58) Field of Classification Search
CPC ..................... G06F 3/012; G06F 3/013; G06T 2207/20084; G06T 2207/30201; G06T 7/80; G06V 10/766; G06V 10/82; G06V 40/161; G06V 40/18; G06V 40/19; G06V 40/193; H04N 17/002; H04N 23/611; H04N 23/617; H04N 23/63; H04N 23/672; H04N 23/675

See application file for complete search history.

(56) References Cited

U.S. PATENT DOCUMENTS

| | | | | |
|---|---|---|---|---|
| 2009/0219484 | A1* | 9/2009 | Ebisawa ................. | A61B 3/113 351/210 |
| 2015/0156803 | A1* | 6/2015 | Ballard .................. | H04W 76/10 455/422.1 |

(Continued)

FOREIGN PATENT DOCUMENTS

| | | |
|---|---|---|
| JP | H04242630 A | 8/1992 |
| JP | 2004008323 A | 1/2004 |
| JP | 2009104524 A | 5/2009 |

*Primary Examiner* — Amy R Hsu
(74) *Attorney, Agent, or Firm* — Canon U.S.A., Inc. IP Division

(57) ABSTRACT

A gaze detection apparatus includes at least one memory and at least one processor which function as: a gaze detection unit configured to detect, based on an eye image in which an eye of a user is imaged, a gaze position which is a position at which the user looks; an orientation detection unit configured to detect a head orientation which is an orientation of a head of the user, based on the eye image; a calibration unit configured to acquire a first correction value for reducing a detection error of the gaze position by a predetermined calibration operation; and a correction unit configured to correct the first correction value, based on gaze information related to a current gaze position, a head orientation during the predetermined calibration operation, and a current head orientation.

12 Claims, 14 Drawing Sheets

(51) Int. Cl.
*G06V 40/18* (2022.01)
*H04N 23/611* (2023.01)

(56) References Cited

U.S. PATENT DOCUMENTS

| | | | |
|---|---|---|---|
| 2015/0212576 A1* | 7/2015 | Ambrus | G06F 3/0482 |
| | | | 345/156 |
| 2017/0344110 A1* | 11/2017 | Yoshioka | G06V 40/193 |
| 2017/0351329 A1* | 12/2017 | Picard | G06V 10/44 |
| 2020/0019241 A1* | 1/2020 | Ninomiya | H04N 23/74 |
| 2021/0153795 A1* | 5/2021 | Shudo | A61B 5/168 |
| 2021/0303066 A1* | 9/2021 | Hakoshima | G06F 3/147 |
| 2023/0058491 A1* | 2/2023 | Takamoto | A61B 3/113 |

* cited by examiner

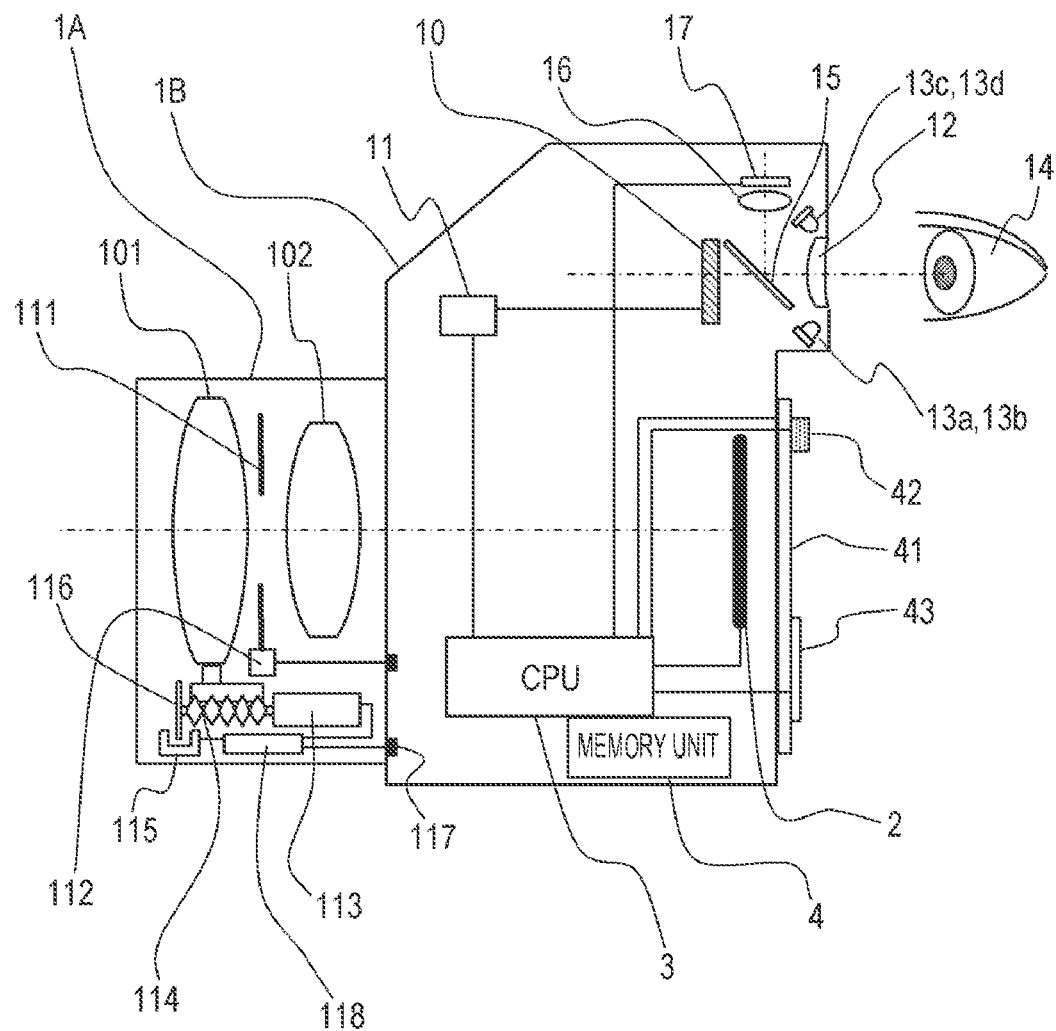
FIG. 2
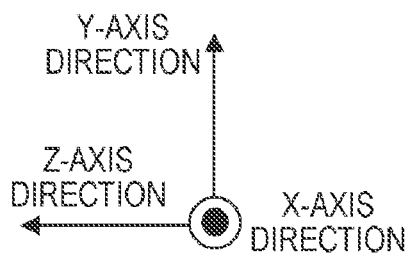

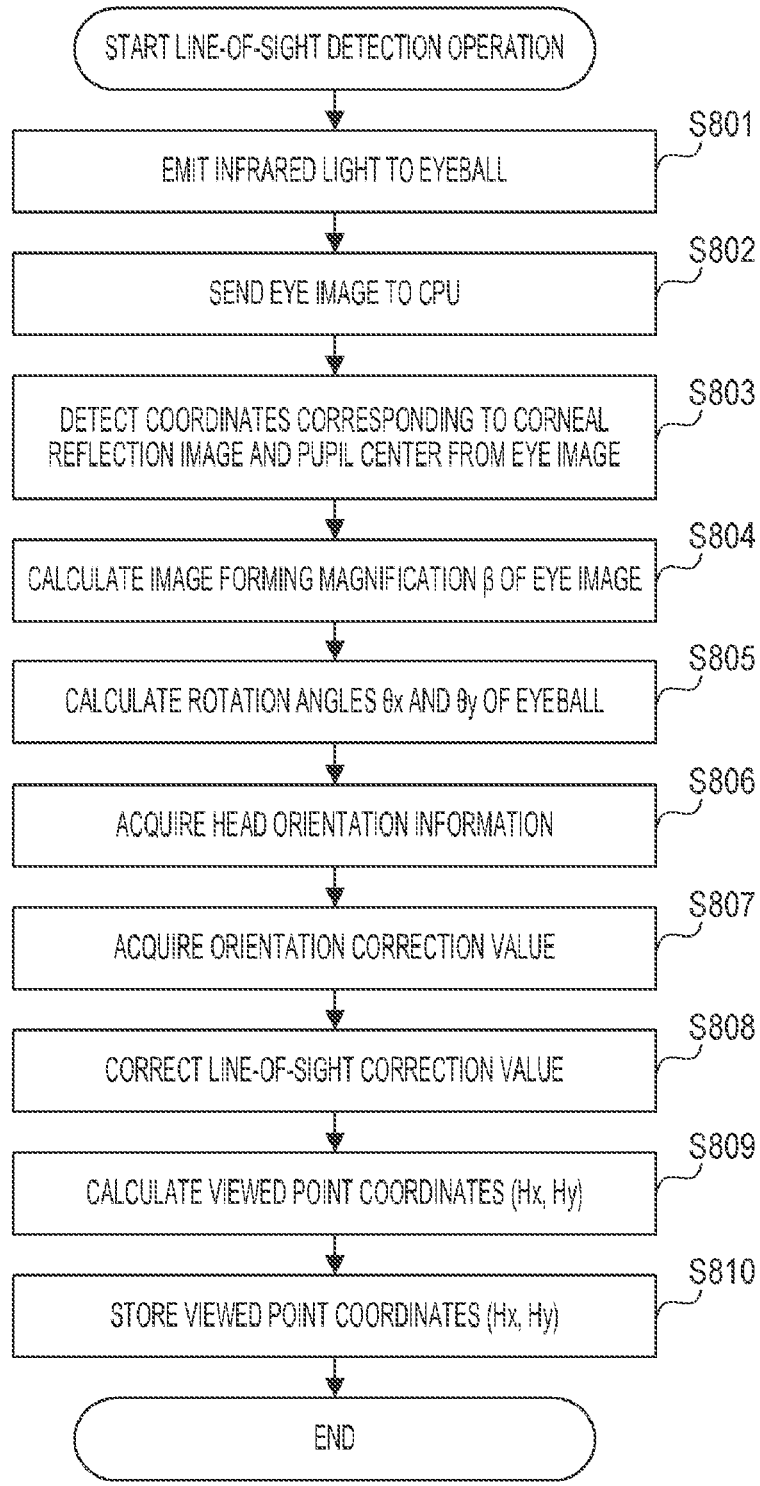

GAZE DETECTION APPARATUS

BACKGROUND

Technical Field

The present disclosure relates to a gaze detection apparatus.

Description of the Related Art

In recent years, a camera is increasingly automated and made intelligent. Japanese Patent Application Publication No. 2004-008323 proposes a technique in which, even when an object position is not input manually, an object, which a photographer targets, is recognized based on information on a line-of-sight position of the photographer who looks into a viewfinder and focus control is thereby performed. A line-of-sight detection apparatus which detects the line-of-sight position of a user is also installed in a wearable device such as VR equipment or AR equipment mounted to a head of the user, and is becoming prevalent as a user interface. Japanese Patent Application Publication No. 2009-104524 proposes a technique in which a line-of-sight direction of a person is determined by determining a face orientation and line-of-sight directions of both eyes on the basis of an image in which an entire face of the person is imaged and integrating the line-of-sight directions of both eyes on the basis of the face orientation. Japanese Patent Application Publication No. H04-242630 proposes a technique in which calibration is performed in order to improve accuracy of line-of-sight detection.

However, it is difficult for the user to use the line-of-sight detection apparatus while keeping a use state, such as a manner in which the user looks into the viewfinder or a mounting state of the wearable device constant, and, even when the calibration is performed, the accuracy of the line-of-sight detection is reduced due to change of the use state.

SUMMARY

The present disclosure provides a technique capable of suppressing a reduction in the accuracy of line-of-sight detection caused by change of a use state of a line-of-sight detection apparatus.

A gaze detection apparatus according to the present disclosure, includes at least one memory and at least one processor which function as: a gaze detection unit configured to detect, based on an eye image in which an eye of a user is imaged, a gaze position which is a position at which the user looks; an orientation detection unit configured to detect a head orientation which is an orientation of a head of the user, based on the eye image; a calibration unit configured to acquire a first correction value for reducing a detection error of the gaze position by a predetermined calibration operation; and a correction unit configured to correct the first correction value, based on gaze information related to a current gaze position, a head orientation during the predetermined calibration operation, and a current head orientation.

Further features of the present disclosure will become apparent from the following description of exemplary embodiments with reference to the attached drawings.

BRIEF DESCRIPTION OF THE DRAWINGS

FIG. 2 is a cross-sectional view of the camera according to Embodiment 1.

FIG. 8 is a flowchart of a line-of-sight detection operation according to Embodiment 1.

DESCRIPTION OF THE EMBODIMENTS

Hereinbelow, embodiments of the present disclosure will be described with reference to the accompanying drawings. It is possible to improve accuracy of line-of-sight (gaze) detection by performing calibration. However, it is difficult for a user to use a line-of-sight detection apparatus while keeping a use state such as a manner in which the user looks into a viewfinder or a mounting state of a wearable device constant and, when the use state is different from that at the time of the calibration, the accuracy of the line-of-sight detection is reduced. In particular, an eyeglass-type wearable device is easily moved similarly to ordinary eyeglasses, and the accuracy of the line-of-sight detection is easily reduced. There is proposed a technique in which line-of-sight detection is performed in consideration of a face orientation. However, even in such a technique, a difference in face orientation from that at the time of the calibration is not considered, and the accuracy of the line-of-sight detection is reduced. To cope with this, in the following embodiments, a difference in the use state of the line-of-sight detection apparatus from that at the time of the calibration is detected, and a correction value obtained by the calibration is corrected according to the detection result. With this, it is possible to suppress a reduction in the accuracy of the line-of-sight detection caused by the difference in the use state of the line-of-sight detection apparatus from that at the time of the calibration.

Embodiment 1

Embodiment 1 of the present disclosure will be described. In Embodiment 1, a description will be given of an example in the case where the present disclosure is applied to an imaging apparatus.

Explanation of Configuration

Figure 1A:
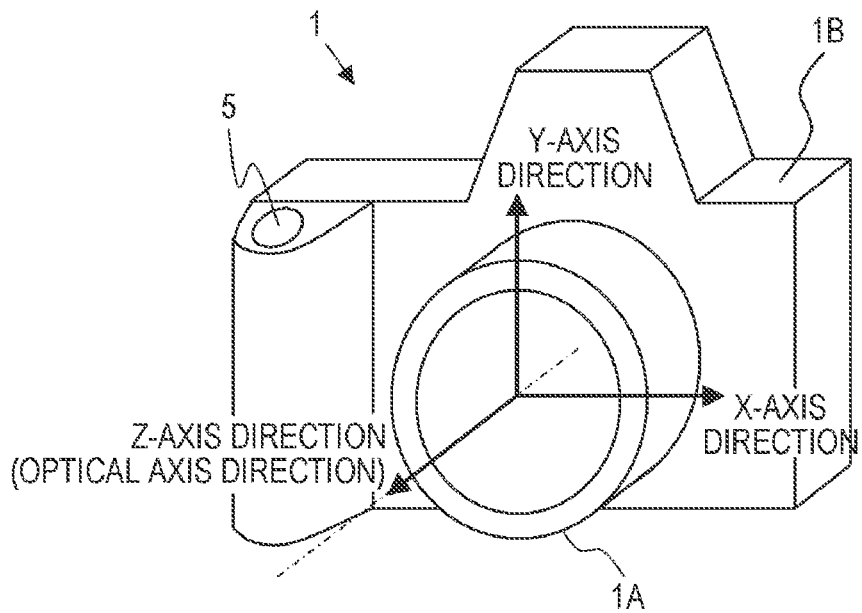
FIGS. 1A and 1B are external views of a camera according to Embodiment 1.
Figure 1B:
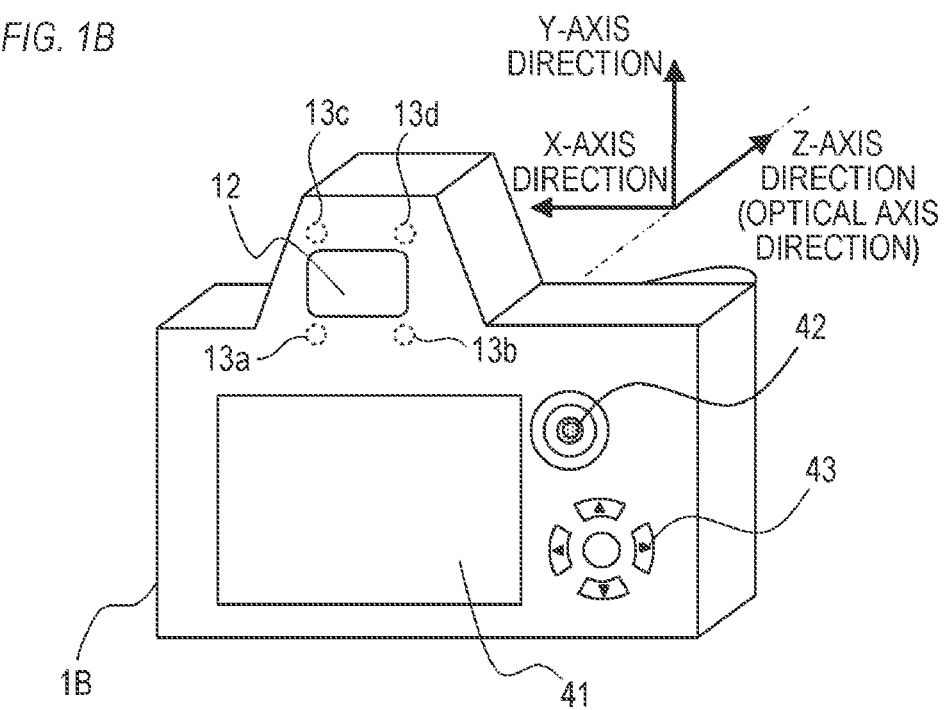

Each of FIGS. 1A and 1B shows the exterior of a camera 1 (digital still camera; interchangeable lens camera) according to Embodiment 1. FIG. 1A is a front perspective view, and FIG. 1B is a rear perspective view. As shown in FIG. 1A, the camera 1 has a photographing lens unit 1A and a camera casing 1B. In the camera casing 1, a release button 5 serving as an operation member which receives photographing operations from a user (photographer) is disposed. As shown in FIG. 1B, on the back of the camera casing 1i, an eyepiece 12 (eyepiece optical system) for the user to look into a display device 10 (display panel) described later which is included in the camera casing 1B is disposed. Note that the eyepiece optical system may include a plurality of lenses. On the back of the camera casing 1i, operation members 41 to 43 which receive various operations from the user are also disposed. For example, the operation member 41 is a touch panel which receives a touch operation, the operation member 42 is an operation lever which can be tilted in each direction, and the operation member 43 is a four-direction key which can be pushed in in each of four directions. The operation member 41 (touch panel) includes a display panel such as a liquid crystal panel, and has the function of displaying an image with the display panel. In addition, four light sources 13a to 13d which illuminate an eyeball of the user are provided around the eyepiece 12. The number of light sources may be more than four or less than four.

FIG. 2 is a cross-sectional view obtained by cutting the camera 1 with a YZ plane formed by a Y axis and a Z axis shown in FIG. 1A, and shows a schematic internal configuration of the camera 1.

In the photographing lens unit 1A, two lenses 101 and 102, a diaphragm 111, a diaphragm drive unit 112, a lens drive motor 113, a lens drive member 114, a photocoupler 115, a pulse plate 116, a mount contact 117, and a focusing circuit 118 are included. The lens drive member 114 is constituted by a drive gear and the like, and the photocoupler 115 detects rotation of the pulse plate 116 which moves in synchronization with the lens drive member 114, and transmits the rotation thereof to the focusing circuit 118. The focusing circuit 118 drives the lens drive motor 113 based on information from the photocoupler 115 and information from the camera casing 1B (information on a lens drive amount) to move the lens 101 and change a focus position. The mount contact 117 is an interface between the photographing lens unit 1A and the camera casing 1B. Note that two lenses 101 and 102 are shown for the sake of simplicity, but three or more lenses are actually included in the photographing lens unit 1A.

In the camera casing 1i, an imaging element 2, a CPU 3, a memory unit 4, the display device 10, and a display device drive circuit 11 are included. The imaging element 2 is disposed on a planned image plane of the photographing lens unit 1A. The CPU 3 is a central processing unit of a microcomputer, and controls the entire camera 1. The memory unit 4 stores an image captured by the imaging element 2 and the like. The display device 10 includes liquid crystal and the like, and displays a captured image (object image) and the like on a screen of the display device 10. The display device drive circuit 11 drives the display device 10. The user can view the screen of the display device 10 through the eyepieces 12.

In the camera casing 1, the light sources 13a to 13d, an optical divider 15, a light receiving lens 16, and an eye imaging element 17 are included. The light sources 13a to 13d are light sources which are conventionally used in a single-lens reflex camera or the like in order to detect a line of sight (gaze) from a relationship between a reflected image (corneal reflection image; Purkinje image) by corneal reflection of light and a pupil, and are light sources for illuminating an eyeball 14 of the user. Specifically, each of the light sources 13a to 13d is an infrared light-emitting diode which emits infrared light which is not sensed by the user, and the light sources 13a to 13d are disposed around the eyepiece 12. An optical image of the illuminated eyeball 14 (eyeball image; an image formed by reflected light which is emitted from the light sources 13a to 13d and is reflected at the eyeball 14) passes through the eyepiece 12 and is reflected at the optical divider 15. Subsequently, the eyeball image is formed on the eye imaging element 17 in which rows of photoelectric elements such as CCDs or CMOSs are two-dimensionally disposed by the light receiving lens 16. The light receiving lens 16 positions the pupil of the eyeball 14 and the eye imaging element 17 such that the pupil of the eyeball 14 and the eye imaging element 17 have a conjugate image formation relationship. By a predetermined algorithm described later, the line of sight of the eyeball 14 is detected from a positional relationship between the eyeball (pupil) and a corneal reflection image in the eyeball image formed on the eye imaging element 17. Specifically, as information related to the line of sight, a line-of-sight direction (a direction of a line of sight; a direction in which the user looks) and an viewed point (a position to which the line of sight is directed; a position at which the user looks; a line-of-sight position) on the screen of the display device 10 are obtained.

Figure 3:
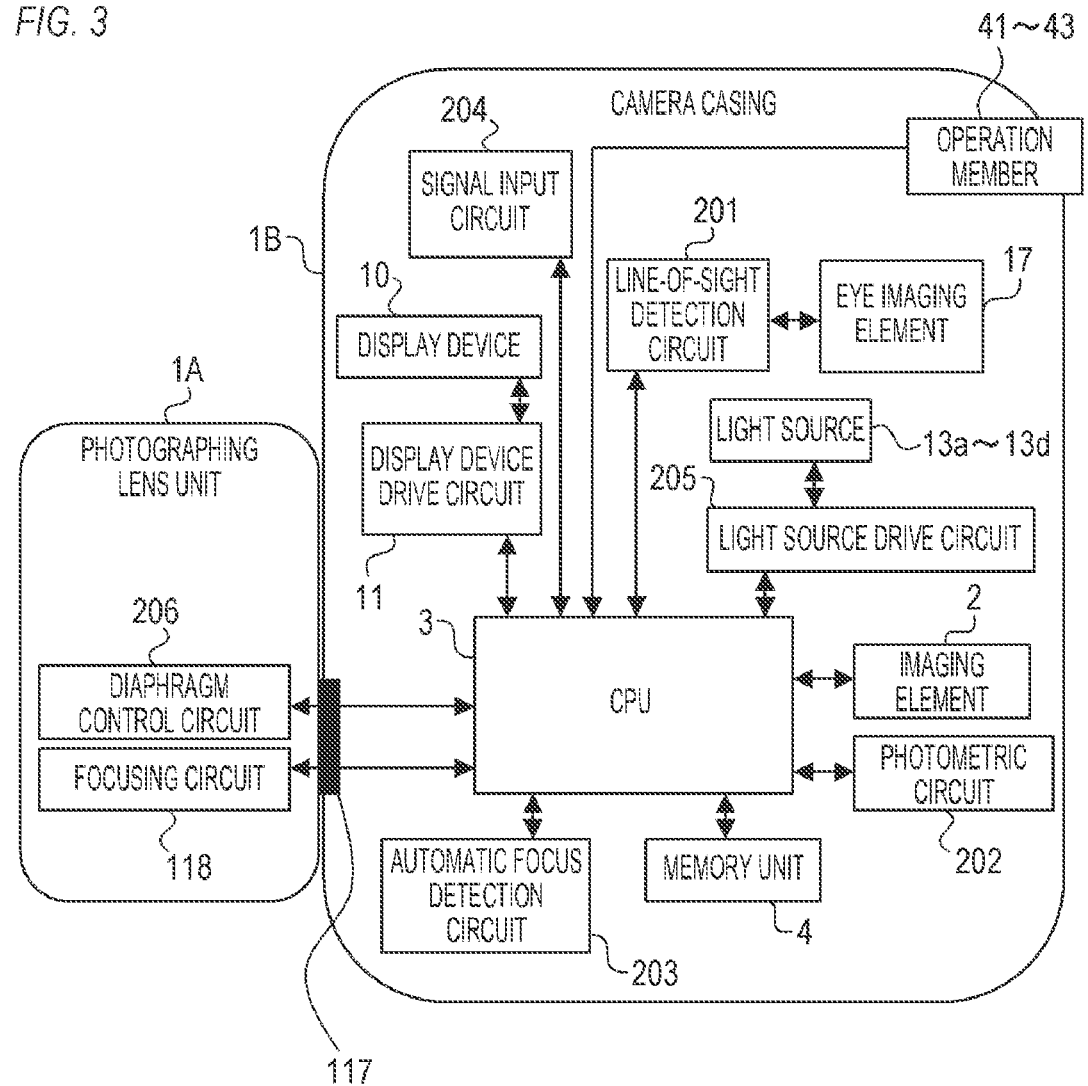
FIG. 3 is a block diagram of the camera according to Embodiment 1.

FIG. 3 is a block diagram showing an electrical configuration in the camera 1. To the CPU 3, a line-of-sight detection circuit 201, a photometric circuit 202, an automatic focus detection circuit 203, a signal input circuit 204, the display device drive circuit 11, and a light source drive circuit 205 are connected. In addition, the CPU 3 transmits signals to the focusing circuit 118 disposed in the photographing lens unit 1A and the diaphragm control circuit 206 included in the diaphragm drive unit 112 in the photographing lens unit 1A via the mount contact 117. The memory unit 4 connected to the CPU 3 has the function of storing an imaging signal from each of the imaging element 2 and the eye imaging element 17, and the function of storing a line-of-sight correction value which corrects an individual difference of the line of sight described later. The line-of-sight correction value can also be viewed as a correction value for reducing a detection error of the viewed point.

The line-of-sight detection circuit 201 is a digital serial interface circuit, and performs A/D conversion on an output (an eye image in which an eye (the eyeball 14) is imaged) of the eye imaging element 17 in a state in which the eye image is formed on the eye imaging element 17, and transmits the result of the A/D conversion to the CPU 3. The CPU 3 extracts a feature point required for line-of-sight detection from the eye image according to a predetermined algorithm described later, and detects the line of sight of the user from the position of the feature point.

The photometric circuit 202 performs amplification, logarithmic compression, and A/D conversion on a signal obtained from the imaging element 2 which also plays the role of a photometric sensor, specifically, a brightness signal corresponding to luminosity of a field, and sends the result thereof to the CPU 3 as field brightness information.

The automatic focus detection circuit 203 performs A/D conversion on signal voltages from a plurality of detection elements (a plurality of pixels) used for phase difference detection which are included in the imaging element 2, and sends the signal voltages subjected to the A/D conversion to the CPU 3. The CPU 3 calculates a distance to an object corresponding to each focus detection point from signals of the plurality of detection elements. This is a publicly known technique known as imaging surface phase difference AF. In Embodiment 1, as an example, it is assumed that the focus detection point is present at each of 180 positions on an imaging surface corresponding to 180 positions shown in a field-of-view image in the viewfinder (the screen of the display device 10) in FIG. 4A.

To the signal input circuit 204, a switch SW1 and a switch SW2 are connected. The switch SW1 is a switch which is turned ON with the first stroke of the release button 5, and is a switch for starting photometry, distance measurement, and a line-of-sight detection operation of the camera 1. The switch SW2 is a switch which is turned ON with the second stroke of the release button 5, and is a switch for starting photographing operations. An ON signal from each of the switches SW1 and SW2 is input to the signal input circuit 204, and is transmitted to the CPU 3.

The light source drive circuit 205 drives the light sources 13a to 13d.

Figure 4A:
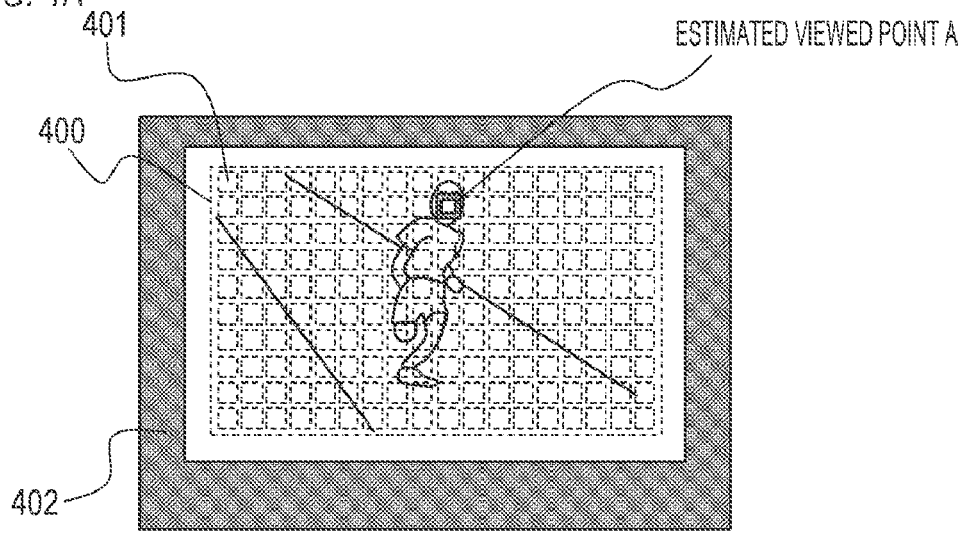
FIGS. 4A to 4C are views each showing a field of view in a viewfinder of the camera according to Embodiment 1.

FIG. 4A is a view showing a field of view in the viewfinder according to Embodiment 1, and shows a state in which the display device 10 is operated (a state in which an image is displayed). As shown in FIG. 4A, in the field of view in the viewfinder, a focus detection area 400, 180 distance-measuring point marks 401, and a field-of-view mask 402 are present. Each of the 180 distance-measuring point marks 401 is superimposed on a through image (live view image) displayed in the display device 10 and is displayed so as to be displayed at a position corresponding to the focus detection point on the imaging surface. In addition, among the 180 distance-measuring point marks 401, the distance-measuring point mark 401 corresponding to a current viewed point A (estimated position) is highlighted with a frame or the like and is displayed.

Explanation of Calibration Operation

Figure 4B:
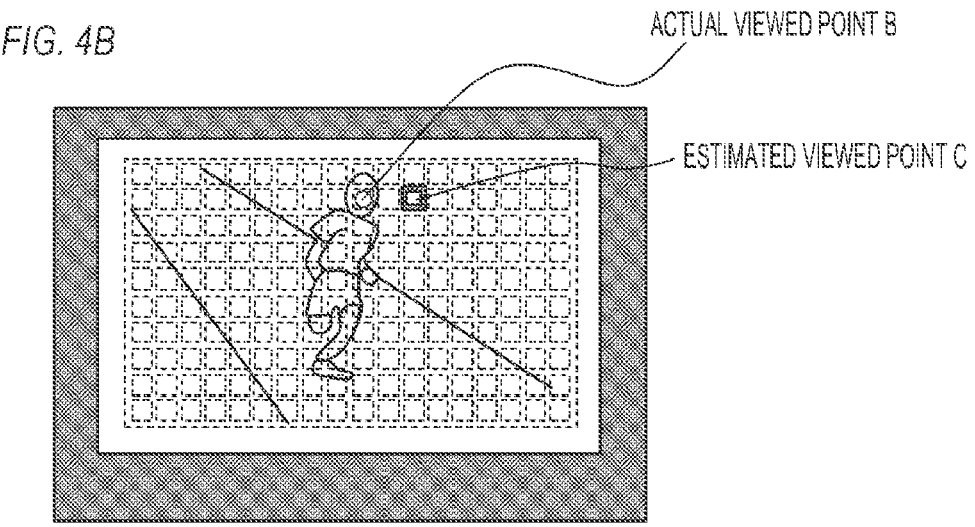

There are cases where it is not possible to estimate the viewed point with high accuracy due to a factor such as an individual difference of the shape of the eyeball of a human. Specifically, when the line-of-sight correction value is not adjusted to a value suitable for the user, as shown in FIG. 4B, a difference occurs between an actual viewed point B and an estimated viewed point C. In FIG. 4B, while the user looks at a person, the camera 1 presumes that the user looks at the background by mistake, and a state in which proper focus detection/adjustment cannot be performed is established.

To cope with this, before imaging by the camera 1 is performed, it is necessary to perform calibration work, acquire a line-of-sight correction value suitable for the user, and store the line-of-sight correction value in the camera 1.

Figure 4C:
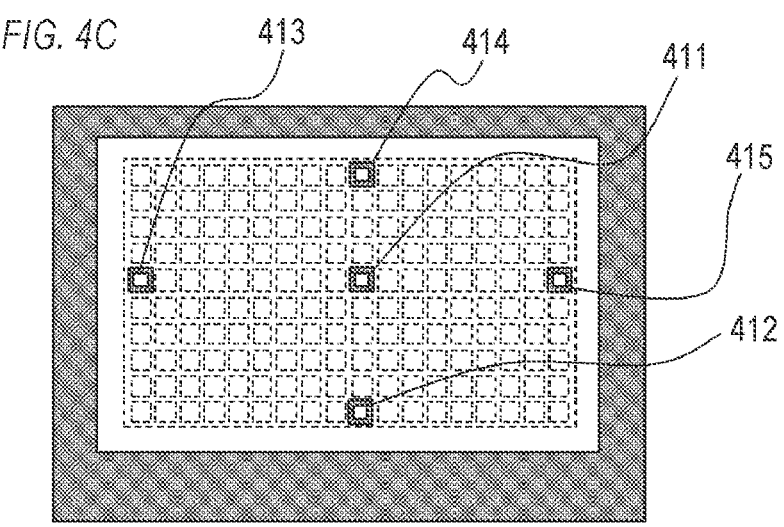

The calibration work is performed by, e.g., highlighting a plurality of marks having different positions as shown in FIG. 4C on the screen of the display device 10 before imaging and causing the user to look at the marks. The line-of-sight detection operation is performed when the user looks at each mark, and a line-of-sight correction parameter suitable for the user is determined from a plurality of calculated viewed points (estimated positions) and coordinates of each mark. Note that a display method of the mark is not particularly limited as long as the position at which the user should look is indicated, and a graphic serving as the mark may be displayed and the mark may also be displayed by changing the brightness or color of an image (a captured image or the like).

Figure 5:
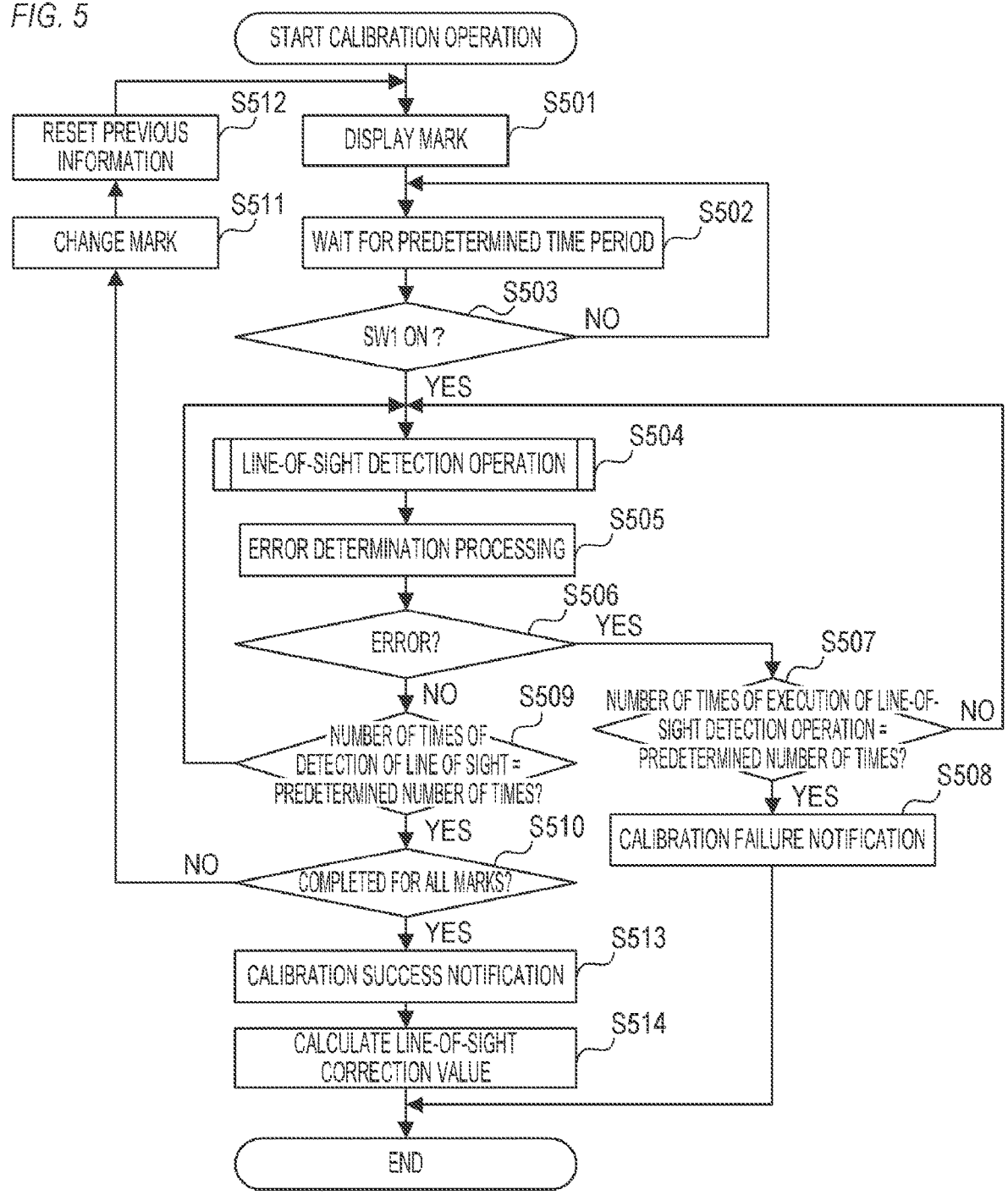
FIG. 5 is a flowchart of a calibration operation according to Embodiment 1.

FIG. 5 is a flowchart of a calibration operation (predetermined calibration operation) according to Embodiment 1. In the calibration operation according to Embodiment 1, not only the line-of-sight correction value but also head orientation information related to the orientation of the head of the user is acquired. The calibration operation is started in response to, e.g., a user operation which provides an instruction to start the calibration work.

In Step S501, the CPU 3 displays the mark at which the user is caused to look in the display device 10.

In Step S502, the CPU 3 performs wait of a predetermined time period.

In Step S503, the CPU 3 determines whether or not the release button 5 is pressed (pressed halfway down) by the user and the switch SW1 is thereby turned ON. For example, in order to indicate that the user has looked at the mark, the user presses the release button 5 halfway down, and turns ON the switch SW1. The CPU 3 advances processing to Step S504 in the case where the switch SW1 is turned ON, and the CPU 3 returns the processing to Step S502 in the case where the switch SW1 is not turned ON.

In Step S504, the CPU 3 performs the line-of-sight detection operation. While the line-of-sight detection operation will be described later by using FIG. 8, in Step S504, processing steps in Steps S801 to S806 in FIG. 8 are performed. In Step S504, the line-of-sight direction is detected. For example, angles (rotation angles $\theta x$ and $\theta y$) of the optical axis of the eyeball 14 with respect to the optical axis of the light receiving lens 16 are calculated. With regard to the optical axis of the eyeball 14, the rotation angle $\theta x$ in the line-of-sight direction of the user is a rotation angle of the eyeball 14 in a Z-X plane (a plane perpendicular to a Y axis), and the rotation angle $\theta y$ is a rotation angle of the eyeball 14 in a Z-Y plane (a plane perpendicular to an X axis). Further, in Step S504, the head orientation information is acquired.

In Step S505, the CPU 3 performs predetermined error determination processing. The error determination processing is processing for determining whether or not the line-of-sight detection operation in Step S504 has failed. For example, in the case where the corneal reflection image is not detected, the CPU 3 determines that the line-of-sight detection operation has failed (an error has occurred in the line-of-sight detection operation). The error determination processing is not limited thereto and, in the error determination processing, it is possible to determine presence or absence of the error with various criteria such as an interval between the corneal reflection images and an interval between a pupil center (the center of the pupil) and the corneal reflection image.

In Step S506, the CPU 3 determines whether or not the line-of-sight detection operation (the current line-of-sight detection operation) in Step S504 has failed according to the result of the error determination processing in Step S505. Subsequently, the CPU 3 advances the processing to Step S507 in the case where the line-of-sight detection operation has failed (the error has occurred in the line-of-sight detection operation), and the CPU 3 advances the processing to Step S509 in the case where the line-of-sight detection operation has succeeded (the error has not occurred in the line-of-sight detection operation).

In Step S507, the CPU 3 determines whether or not the number of times of execution of the line-of-sight detection operation has reached a predetermined number of times thereof. Subsequently, the CPU 3 returns the processing to Step S504 in the case where the number of times of execution of the line-of-sight detection operation is less than the predetermined number of times thereof, and the CPU 3 advances the processing to Step S508 in the case where the number of times of execution of the line-of-sight detection operation is equal to the predetermined number of times thereof. The number of times of execution of the line-of-sight detection operation is counted by the CPU 3. Instead of the number of times of execution of the line-of-sight detection operation (the number of times of success+the number of times of failure), the number of times of failure of the line-of-sight detection operation may be counted.

In Step S508, the CPU 3 determines that calibration (determination of the line-of-sight correction value) cannot be performed properly, and notifies the user of failure of the calibration. Subsequently, the CPU 3 ends the calibration operation.

In Step S509, the CPU 3 determines whether or not the number of times of detection of the line-of-sight direction (the number of times in which the line-of-sight direction is detected; the number of times in which the rotation angles θx and θy are calculated; the number of times of success of the line-of-sight detection operation) has reached a predetermined number of times thereof. Subsequently, the CPU 3 returns the processing to Step S504 in the case where the number of times of detection of the line-of-sight direction is less than the predetermined number of times thereof, and the CPU 3 advances the processing to Step S510 in the case where the number of times of detection of the line-of-sight direction has reached the predetermined number of times thereof. The number of times of detection of the line-of-sight direction is counted by the CPU 3.

In Step S510, the CPU 3 determines whether or not the line-of-sight detection (the processing steps in Steps S501 to S509) is completed for all of the marks. Subsequently, the CPU 3 advances the processing to Step S511 in the case where the mark on which the line-of-sight detection is not performed remains, and the CPU 3 advances the processing to Step S513 in the case where the line-of-sight detection is completed for all of the marks.

In Step S511, the CPU 3 changes (switches) the mark displayed in Step S501 to the next mark.

In Step S512, the CPU 3 resets information obtained in a state in which the mark before the change is displayed. For example, the CPU 3 resets the rotation angles θx and θy. The CPU 3 also resets the numbers of times (the number of times of execution of the line-of-sight detection operation and the number of times of detection of the line-of-sight direction) which are counted for the processing steps in Steps S507 and S509. Subsequently, the CPU 3 returns the processing to Step S501.

In Step S513, the CPU 3 notifies the user of the success of the calibration.

In Step S514, the CPU 3 calculates the line-of-sight correction value based on the line-of-sight direction (the rotation angles θx and θy) detected for each mark, and stores the line-of-sight correction value in the memory unit 4 together with the head orientation information acquired in Step S504. Subsequently, the CPU 3 ends the calibration operation. The head orientation information stored in the memory unit 4 is information related to a representative head orientation during the calibration operation. For example, the head orientation information is a value indicative of the orientation of the head, and the head orientation information stored in the memory unit 4 is the average, the median value, or the mode of the value (head orientation information) obtained during the calibration operation.

In Step S514, as the line-of-sight correction value, correction values Ax, Bx, Ay, and By are calculated. The correction value Ax is an offset in an X-axis direction, the correction value Bx is a sensitivity in the X-axis direction, the correction value Ay is an offset in a Y-axis direction, and the correction value By is a sensitivity in the Y-axis direction.

As an example, a description will be given of the case where marks are sequentially displayed at five positions which are the center, the upper end, the lower end, the left end, and the right end of the screen of the display device 10. It is assumed that a mark 411 at the center in FIG. 4C corresponds to the rotation angle θx=φx1 and the rotation angle θy=φy1. If the rotation angle θx=φx1 and the rotation angle θy=φy1 are obtained when the user looks at the mark 411, the offsets Ax and Ay can be calculated by the following Formulas 1-1 and 1-2.

$$Ax = \theta x1 - \varphi x1 \quad \text{(Formula 1-1)}$$

$$Ay = \theta y1 - \varphi y1 \quad \text{(Formula 1-2)}$$

It is assumed that a mark 412 in FIG. 4C corresponds to the rotation angle θx=φx2 and the rotation angle θy=φy2, and a mark 413 corresponds to the rotation angle θx=φx3 and the rotation angle θy=φy3. It is assumed that a mark 414 corresponds to the rotation angle θx=φx4 and the rotation angle θy=φy4, and a mark 415 corresponds to the rotation angle θx=φx5 and the rotation angle θy=φy5. It is assumed that the rotation angle θx=θx2 and the rotation angle θy=θy2 are obtained when the user looks at the mark 412, and the rotation angle θx=θx3 and the rotation angle θy=θy3 are obtained when the user looks at the mark 413. In addition, it is assumed that the rotation angle θx=θx4 and the rotation angle θy=θy4 are obtained when the user looks at the mark 414, and the rotation angle θx=θx5 and the rotation angle θy=θy5 are obtained when the user looks at the mark 415. Accordingly, the sensitivities Bx and By can be calculated by the following Formulas 2-1 and 2-2.

$$Bx = (\theta x2 - \theta x3)/(\varphi x2 - \varphi x3) \quad \text{(Formula 2-1)}$$

$$By = (\theta y4 - \theta y5)/(\varphi y4 - \varphi y5) \quad \text{(Formula 2-2)}$$

Explanation of Line-of-Sight Detection Operation

Figure 6:
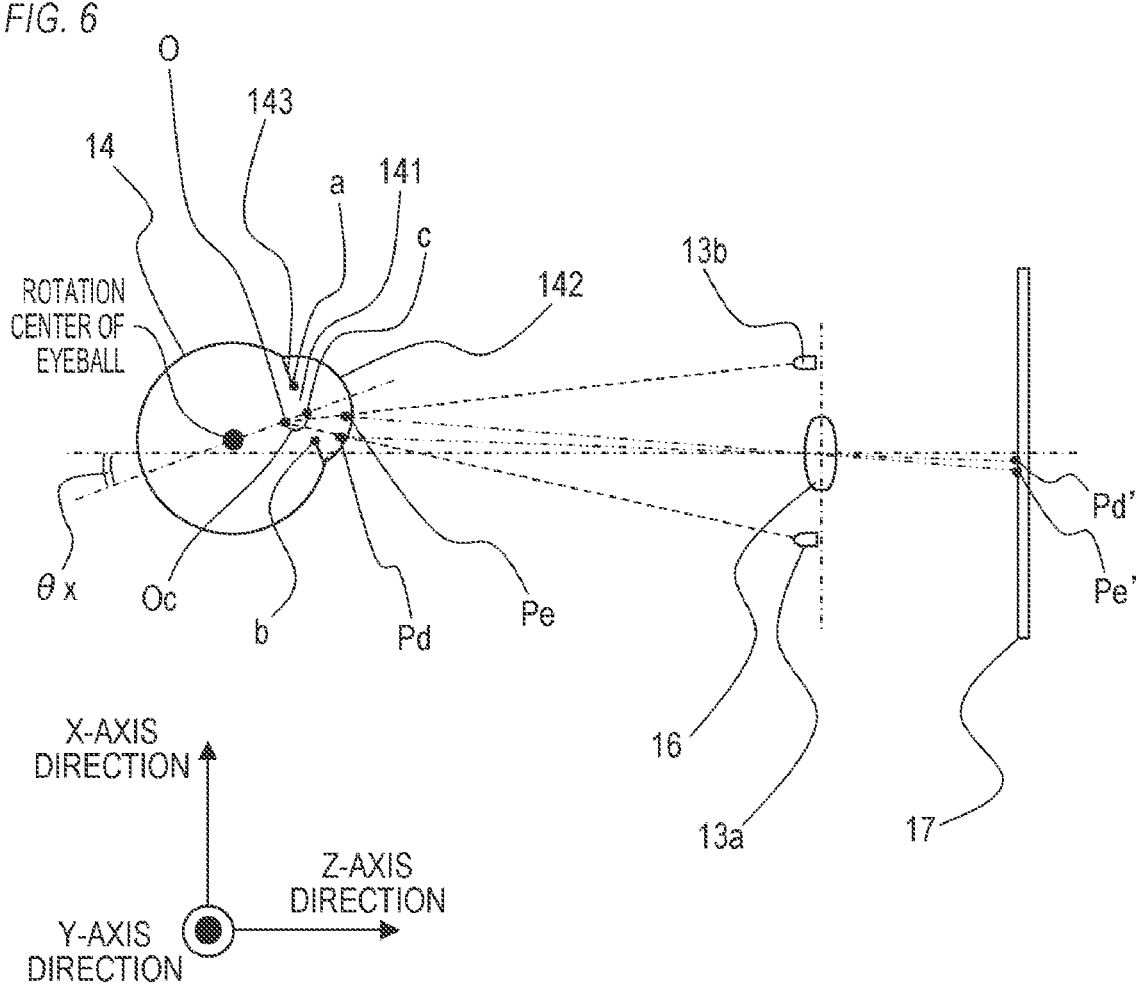
FIG. 6 is a view for explaining principles of a line-of-sight detection method according to Embodiment 1.
Figure 7A:
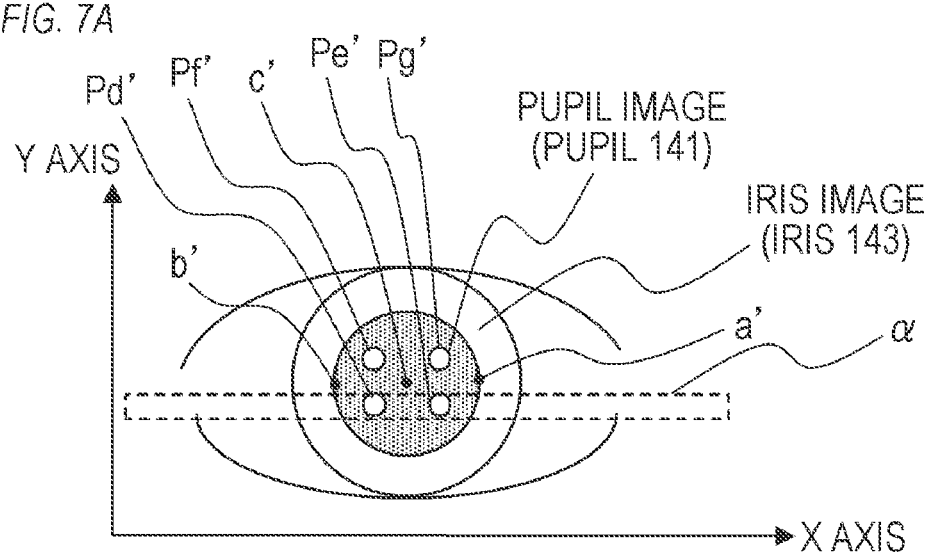
FIG. 7A is a view showing an eye image according to Embodiment 1.
Figure 7B:
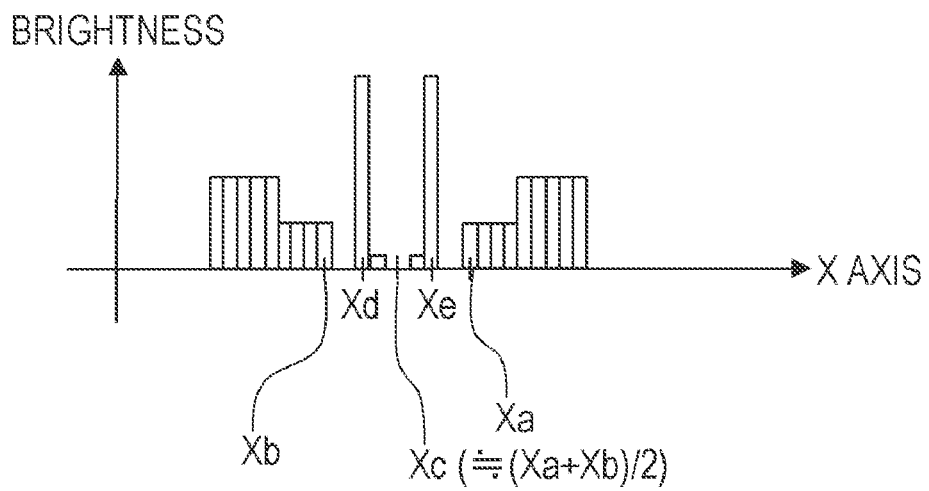
FIG. 7B is a view showing a brightness distribution of the eye image according to Embodiment 1.

A line-of-sight detection method will be described by using FIGS. 6, 7A, 7B, and 8. FIG. 6 is a view for explaining principles of the line-of-sight detection method, and is a schematic view of an optical system for performing line-of-sight detection. As shown in FIG. 6, the light sources 13a and 13b are disposed so as to be substantially symmetrical with respect to the optical axis of the light receiving lens 16, and illuminate the eyeball 14 of the user. Part of light emitted from the light sources 13a and 13b and reflected at the eyeball 14 is collected at the eye imaging element 17 by the light receiving lens 16. Similarly, the light sources 13c and 13d are disposed so as to be substantially symmetrical with respect to the optical axis of the light receiving lens 16, and illuminate the eyeball 14 of the user. Part of light emitted from the light sources 13c and 13d and reflected at the eyeball 14 is collected at the eye imaging element 17 by the light receiving lens 16. FIG. 7A is a schematic view of an eye image (an eye image projected onto the eye imaging element 17) captured in the eye imaging element 17, and FIG. 7B is a view showing an output intensity of the eye imaging element 17. FIG. 8 is a flowchart of the line-of-sight detection operation according to Embodiment 1.

When the line-of-sight detection operation is started, the light sources 13a to 13d emit infrared light toward the eyeball 14 of the user in Step S801 in FIG. 8. The eyeball image of the user illuminated with the infrared light is formed on the eye imaging element 17 through the light receiving lens 16, and is subjected to photoelectric conversion by the eye imaging element 17. With this, an electrical signal of the eye image which can be processed is obtained.

In Step S802, the line-of-sight detection circuit 201 sends the eye image (an eye image signal; the electrical signal of the eye image) obtained from the eye imaging element 17 to the CPU 3.

In Step S803, the CPU 3 determines coordinates of points corresponding to corneal reflection images Pd, Pe, Pf, and Pg, and a pupil center c of the light sources 13a to 13d from the eye image obtained in Step S802.

The infrared light emitted from the light sources 13a to 13d illuminates a cornea 142 of the eyeball 14 of the user. At this point, the corneal reflection images Pd, Pe, Pf, and Pg formed by part of the infrared light reflected at the surface of the cornea 142 are collected by the light receiving lens 16, are formed on the eye imaging element 17, and become corneal reflection images Pd', Pe', Pf', and Pg' in the eye image. Similarly, light fluxes from end portions a and b of the pupil 141 are formed into images on the eye imaging element 17, and the images become pupil end images a' and b' in the eye image.

FIG. 7B shows brightness information (brightness distribution) of an area a in the eye image in FIG. 7A. In FIG. 7B, a horizontal direction of the eye image is assumed to be an X-axis direction, a vertical direction thereof is assumed to be a Y-axis direction, and the brightness distribution in the X-axis direction is shown. In Embodiment 1, coordinates of the corneal reflection images Pd' and Pe' in the X-axis direction (horizontal direction) are denoted by Xd and Xe, and coordinates of the pupil end images a' and b' in the X-axis direction are denoted by Xa and Xb. As shown in FIG. 7B, at the coordinates Xd and Xe of the corneal reflection images Pd' and Pe', brightnesses each having an extremely high level are obtained. In an area from the coordinate Xa to the coordinate Xb corresponding to an area of the pupil 141 (an area of a pupil image obtained by formation of the light fluxes from the pupil 141 into an image on the eye imaging element 17), except the coordinates Xd and Xe, brightnesses each having an extremely low level are obtained. In addition, in an area of an iris 143 outside the pupil 141 (an area of an iris image outside the pupil image obtained by formation of light fluxes from the iris 143 into an image), brightnesses each having a level in the middle between the two types of brightnesses described above are obtained. Specifically, in an area in which an X coordinate (a coordinate in the X-axis direction) is smaller than the coordinate Xa and in an area in which the X coordinate is larger than the coordinate Xb, the brightnesses each having the level in the middle between the two types of brightnesses described above are obtained.

From the brightness distribution shown in FIG. 7B, it is possible to obtain the X coordinates Xd and Xe of the corneal reflection images Pd' and Pe', and the X coordinates Xa and Xb of the pupil end images a' and b'. Specifically, it is possible to obtain the coordinate having an extremely high brightness as the coordinate of each of the corneal reflection images Pd' and Pe', and obtain the coordinate having an extremely low brightness as the coordinate of each of the pupil end images a' and b'. In addition, in the case where the rotation angle θx of the optical axis of the eyeball 14 with respect to the optical axis of the light receiving lens 16 is small, an X coordinate Xc of a pupil center image c' (the center of the pupil image) obtained by formation of the light flux from the pupil center c into an image on the eye imaging element 17 can be expressed as Xc≈(Xa+Xb)/2. That is, it is possible to calculate the X coordinate Xc of the pupil center image c' from the X coordinates Xa and Xb of the pupil end images a' and b'. Thus, it is possible to estimate the coordinates of the corneal reflection images Pd' and Pe' and the coordinate of the pupil center image c'. Similarly, it is possible to estimate the coordinates of the corneal reflection images Pf' and Pg'.

The description will return to FIG. 8. In Step S804, the CPU 3 calculates an image forming magnification R of the eye image. The image forming magnification R is a magnification determined by the position of the eyeball 14 with respect to the light receiving lens 16, and it is possible to determine the image forming magnification R by using, e.g., a function of an interval (Xd–Xe) between the corneal reflection images Pd' and Pe'.

In Step S805, the CPU 3 calculates the rotation angles θx and θy of the optical axis of the eyeball 14 with respect to the optical axis of the light receiving lens 16. The X coordinate of a middle point between the corneal reflection image Pd and the corneal reflection image Pe and the X coordinate of a center of curvature O of the cornea 142 substantially match each other. Accordingly, when it is assumed that a standard distance from the center of curvature O of the cornea 142 to the center c of the pupil 141 is denoted by Oc, the rotation angle θx of the eyeball 14 in a Z-X plane (a plane perpendicular to the Y axis) can be calculated by the following Formula 3. The rotation angle θy of the eyeball 14 in a Z-Y plane (a plane perpendicular to the X axis) can also be calculated by the same method as the calculation method of the rotation angle θx.

$$\beta \times Oc \times \mathrm{SIN}\ \theta x \approx \{(Xd+Xe)/2\} - Xc \quad \text{(Formula 3)}$$

Figure 9:
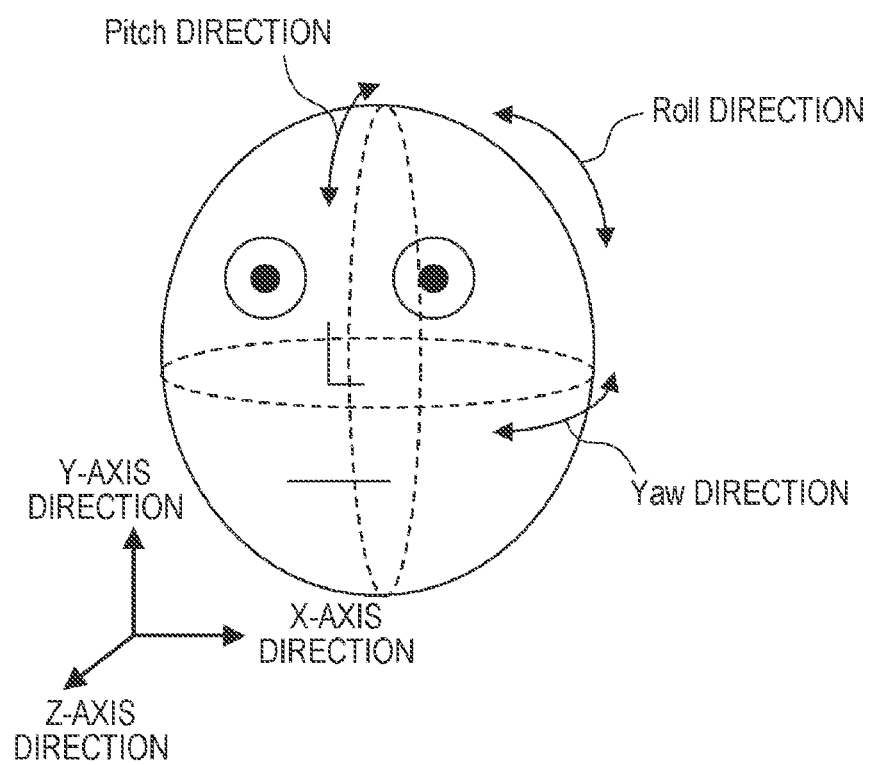
FIG. 9 is a view showing rotation directions of a head according to Embodiment 1.

In Step S806, the CPU 3 acquires the head orientation information based on the eye image obtained in Step S802. This processing can be viewed as orientation detection processing which detects the head orientation which is the orientation of the head of the user. In Embodiment 1, as shown in FIG. 9, information which pays attention to the rotation of the head in a Yaw direction, the rotation of the head in a Roll direction, and the rotation of the head in a Pitch direction is acquired as the head orientation information. The Yaw direction is a rotation direction about a Yaw axis, the Roll direction is a rotation direction about a Roll axis, and the Pitch direction is a rotation direction about a Pitch axis.

Figure 10A:
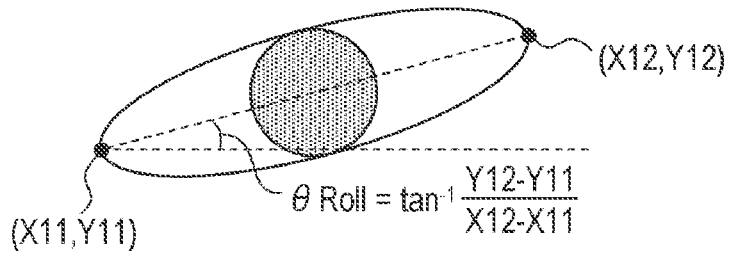
FIGS. 10A to 10C are views for explaining an acquisition method of head orientation information according to Embodiment 1.

For example, as shown in FIG. 10A, the CPU 3 detects the position of the inner corner of the eye (coordinates (X11, Y11)) and the position of the outer corner of the eye (coordinates (X12, Y12)) from the eye image. A detection method of these positions (feature points) is not particularly limited, and it is possible to detect the feature points by, e.g., a method in which matching using a predetermined template is performed and a method in which an edge is detected and scanning is performed. Subsequently, the CPU 3 calculates a rotation angle θRoll of the head about the Roll axis from an inclination of a line segment which joins the inner corner of the eye and the outer corner of the eye. The CPU 3 calculates the rotation angle θRoll of the head about the Roll axis by using the following Formula 4.

$$\theta \mathrm{Roll} = \tan^{-1}((Y12-Y11)/(X12-X11)) \quad \text{(Formula 4)}$$

Next, the CPU 3 calculates an eyepiece distance from the interval between the corneal reflection images, and calculates a rotation angle θYaw of the head about the Yaw axis and a rotation angle θPitch of the head about the Pitch axis from the eyepiece distance. The interval between the corneal reflection images is strongly correlated to the eyepiece distance and, as the interval between the corneal reflection images is longer, the calculated eyepiece distance is shorter.

Figure 10B:
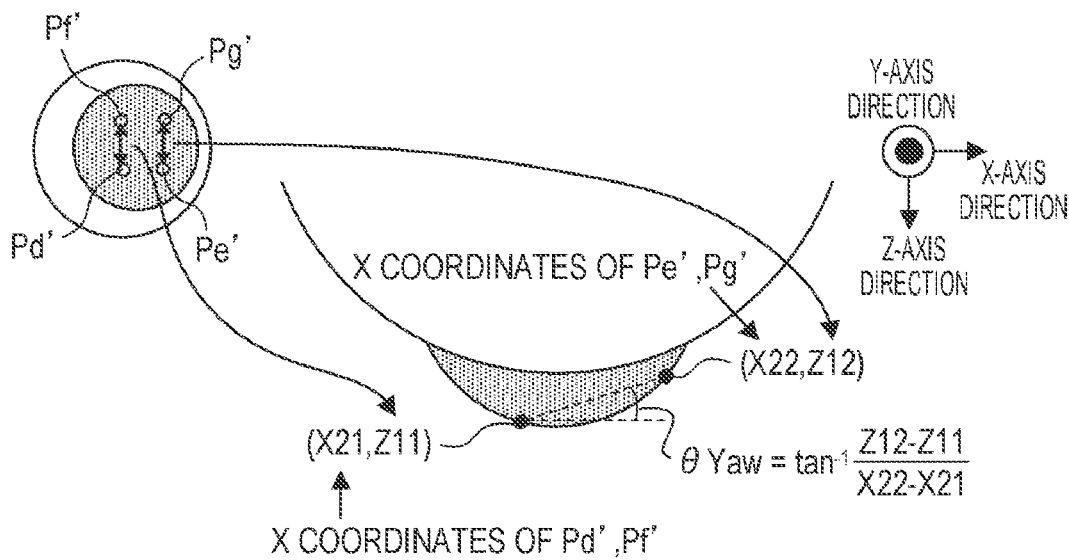

As shown in FIG. 10B, the CPU 3 calculates a left eyepiece distance (coordinate Z11) from an interval between the left corneal reflection images Pd' and Pf', and calculates a right eyepiece distance (coordinate Z12) from an interval between the right corneal reflection images Pe' and Pg'. Subsequently, the CPU 3 calculates the rotation angle θYaw by using the following Formula 5. In Formula 5, a coordinate X21 is an X coordinate of each of the corneal reflection images Pd' and Pf', and a coordinate X22 is an X coordinate of each of the corneal reflection images Pe' and Pg'.

$$\theta Yaw = \tan^{-1}((Z12-Z11)/(X22-X21)) \quad \text{(Formula 5)}$$

Figure 10C:
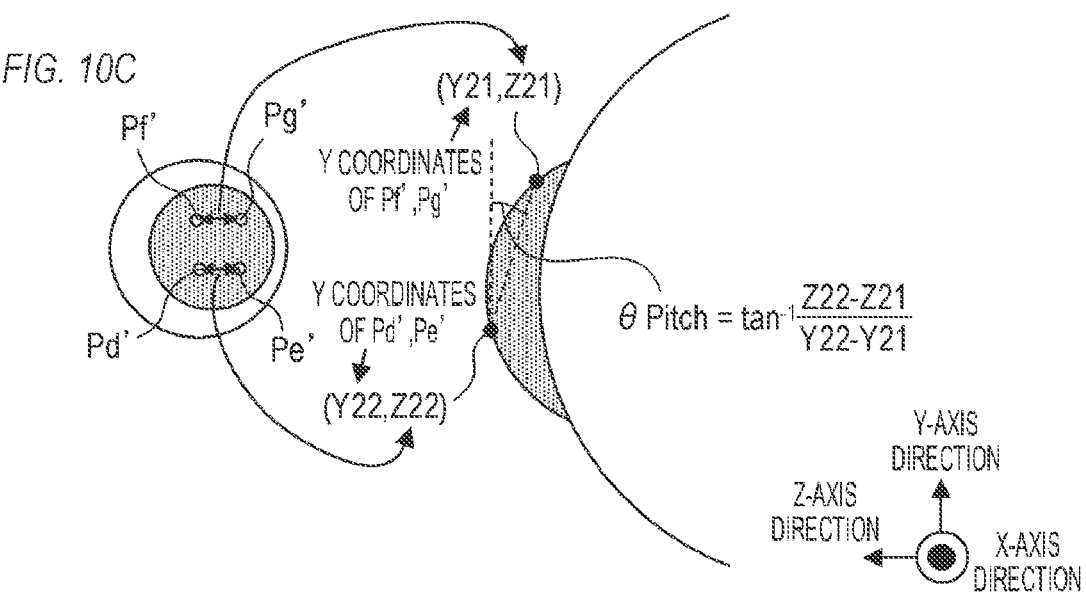

As shown in FIG. 10C, the CPU 3 calculates an upper eyepiece distance (coordinate Z21) from an interval between the upper corneal reflection images Pf' and Pg', and calculates a lower eyepiece distance (coordinate Z22) from an interval between the lower corneal reflection images Pd' and Pe'. Subsequently, the CPU 3 calculates the rotation angle θPitch by using the following Formula 6. In Formula 6, a coordinate Y21 is a Y coordinate of each of the corneal reflection images Pf' and Pg', and a coordinate Y22 is a Y coordinate of each of the corneal reflection images Pd' and Pe'.

$$\theta Pitch = \tan^{-1}((Z22-Z21)/(Y22-Y21)) \quad \text{(Formula 6)}$$

Note that the head orientation information is not limited to the above-described information, and may also be another information related to the orientation of the head of the user. In addition, an acquisition method of the eyepiece distance is not limited to the above method, and the eyepiece distance may also be acquired by using, e.g., a distance measuring sensor.

The description will return to FIG. 8. In Steps S807 and S808, the CPU 3 corrects line-of-sight correction values Ax, Ay, Bx, and By based on line-of-sight information related to the current viewed point, the head orientation during the calibration operation, and the current head orientation. It is assumed that the line-of-sight correction values Ax, Ay, Bx, and By are acquired by the calibration operation in FIG. 5, and are stored in the memory unit 4 before the line-of-sight detection operation in FIG. 8 is started.

In Step S807, the CPU 3 acquires orientation correction values kax, kbx, kay, and kby based on the current line-of-sight information, the head orientation information acquired during the calibration operation, and the head orientation information acquired in Step S806. As the line-of-sight information, for example, the center position (the coordinate Xc) of the pupil image, a center-of-gravity position of the corneal reflection images Pd', Pe', Pf', and Pg', and intervals between the corneal reflection images Pd', Pe', Pf', and Pg' are used. The orientation correction values kax, kbx, kay, and kby are correction values for correcting the line-of-sight correction values Ax, Ay, Bx, and By.

In Embodiment 1, the following twelve functions are predetermined, and the CPU 3 calculates orientation correction values kax_Yaw, kbx_Yaw, kay_Yaw, kby_Yaw, kax_Roll, kbx_Roll, kay_Roll, kby_Roll, kax_Pitch, kbx_Pitch, kay_Pitch, and kby_Pitch by using the twelve functions. The following twelve functions are obtained by, e.g., fitting which uses a plurality of experimental values.

a function which receives three pieces of information which are the current line-of-sight information, the rotation angle θYaw acquired during the calibration operation, and the rotation angle θYaw acquired in Step S806 as inputs, and outputs the orientation correction value kax_Yaw a function which receives three pieces of information which are the current line-of-sight information, the rotation angle θYaw acquired during the calibration operation, and the rotation angle θYaw acquired in Step S806 as inputs, and outputs the orientation correction value kbx_Yaw a function which receives three pieces of information which are the current line-of-sight information, the rotation angle θYaw acquired during the calibration operation, and the rotation angle θYaw acquired in Step S806 as inputs, and outputs the orientation correction value kay_Yaw a function which receives three pieces of information which are the current line-of-sight information, the rotation angle θYaw acquired during the calibration operation, and the rotation angle θYaw acquired in Step S806 as inputs, and outputs the orientation correction value kby_Yaw a function which receives three pieces of information which are the current line-of-sight information, the rotation angle θRoll acquired during the calibration operation, and the rotation angle θRoll acquired in Step S806 as inputs, and outputs the orientation correction value kax_Roll a function which receives three pieces of information which are the current line-of-sight information, the rotation angle θRoll acquired during the calibration operation, and the rotation angle θRoll acquired in Step S806 as inputs, and outputs the orientation correction value kbx_Roll a function which receives three pieces of information which are the current line-of-sight information, the rotation angle θRoll acquired during the calibration operation, and the rotation angle θRoll acquired in Step S806 as inputs, and outputs the orientation correction value kay_Roll a function which receives three pieces of information which are the current line-of-sight information, the rotation angle θRoll acquired during the calibration operation, and the rotation angle θRoll acquired in Step S806 as inputs, and outputs the orientation correction value kby_Roll a function which receives three pieces of information which are the current line-of-sight information, the rotation angle θPitch acquired during the calibration operation, and the rotation angle θPitch acquired in Step S806 as inputs, and outputs the orientation correction value kax_Pitch a function which receives three pieces of information which are the current line-of-sight information, the rotation angle θPitch acquired during the calibration operation, and the rotation angle θPitch acquired in Step S806 as inputs, and outputs the orientation correction value kbx_Pitch a function which receives three pieces of information which are the current line-of-sight information, the rotation angle θPitch acquired during the calibration operation, and the rotation angle θPitch acquired in Step S806 as inputs, and outputs the orientation correction value kay_Pitch a function which receives three pieces of information which are the current line-of-sight information, the rotation angle θPitch acquired during the calibration operation, and the rotation angle θPitch acquired in Step S806 as inputs, and outputs the orientation correction value kby_Pitch The orientation correction value kax_Yaw is a Yaw-axis component of the orientation correction value kax, and is an offset of the rotation angle θx corresponding to a difference between the rotation angle θYaw during the calibration operation and the current rotation angle θYaw. The orientation correction value kbx_Yaw is a Yaw-axis component of the orientation correction value kbx, and is a change rate of the rotation angle θx corresponding to a difference between the rotation angle θYaw during the calibration operation and the current rotation angle θYaw. The orientation correction value kay_Yaw is a Yaw-axis component of the orientation correction value kay, and is an offset of the rotation angle θy corresponding to a difference between the rotation angle θYaw during the calibration operation and the current rotation angle θYaw. The orientation correction value kby_Yaw is a Yaw-axis component of the orientation correction value kby, and is a change rate of the rotation angle θy corresponding to a difference between the rotation angle θYaw during the calibration operation and the current rotation angle θYaw.

The orientation correction value kax_Roll is a Roll-axis component of the orientation correction value kax, and is an offset of the rotation angle θx corresponding to a difference between the rotation angle θRoll during the calibration operation and the current rotation angle θRoll. The orientation correction value kbx_Roll is a Roll-axis component of the orientation correction value kbx, and is a change rate of the rotation angle θx corresponding to a difference between the rotation angle θRoll during the calibration operation and the current rotation angle θRoll. The orientation correction value kay_Roll is a Roll-axis component of the orientation correction value kay, and is an offset of the rotation angle θy corresponding to a difference between the rotation angle θRoll during the calibration operation and the current rotation angle θRoll. The orientation correction value kby_Roll is a Roll-axis component of the orientation correction value kby, and is a change rate of the rotation angle θy corresponding to a difference between the rotation angle θRoll during the calibration operation and the current rotation angle θRoll.

The orientation correction value kax_Pitch is a Pitch-axis component of the orientation correction value kax, and is an offset of the rotation angle θx corresponding to a difference between the rotation angle θPitch during the calibration operation and the current rotation angle θPitch. The orientation correction value kbx_Pitch is a Pitch-axis component of the orientation correction value kbx, and is a change rate of the rotation angle θx corresponding to a difference between the rotation angle θPitch during the calibration operation and the current rotation angle θPitch. The orientation correction value kay_Pitch is a Pitch-axis component of the orientation correction value kay, and is an offset of the rotation angle θy corresponding to a difference between the rotation angle θPitch during the calibration operation and the current rotation angle θPitch. The orientation correction value kby_Pitch is a Pitch-axis component of the orientation correction value kby, and is a change rate of the rotation angle θy corresponding to a difference between the rotation angle θPitch during the calibration operation and the current rotation angle θPitch.

Subsequently, the CPU 3 calculates the orientation correction values kax, kbx, kay, and kby from the twelve orientation correction values calculated by using the above twelve functions by using the following Formulas 7-1 to 7-4.

$$kax = kax\_\text{Yaw} + kax\_\text{Roll} + kax\_\text{Pitch} \quad \text{(Formula 7-1)}$$

$$kbx = kbx\_\text{Yaw} \times kbx\_\text{Roll} \times kbx\_\text{Pitch} \quad \text{(Formula 7-2)}$$

$$kay = kay\_\text{Yaw} + kay\_\text{Roll} + kay\_\text{Pitch} \quad \text{(Formula 7-3)}$$

$$kby = kby\_\text{Yaw} \times kby\_\text{Roll} \times kby\_\text{Pitch} \quad \text{(Formula 7-4)}$$

Figure 11:
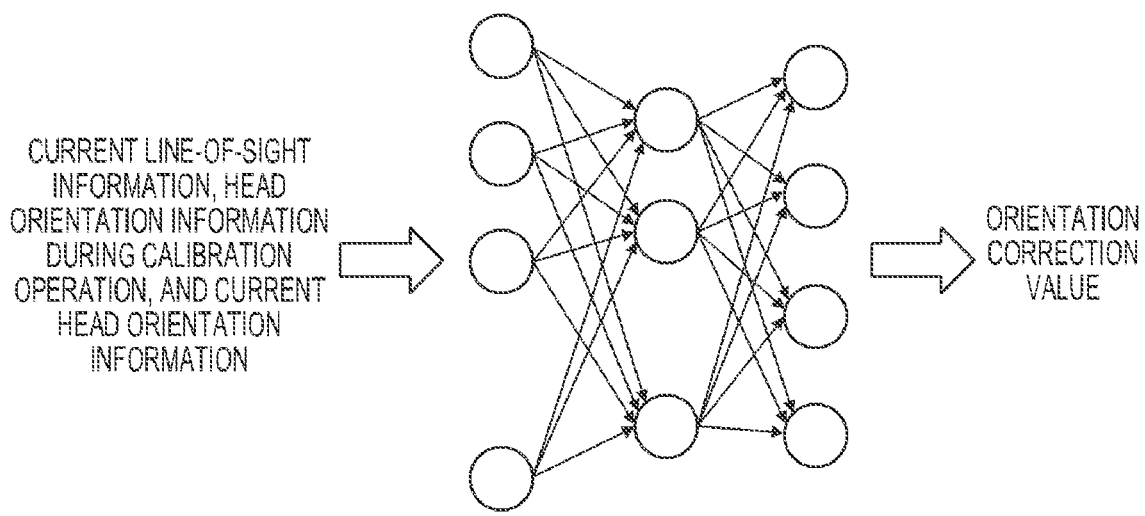
FIG. 11 is a view showing a neural network according to Embodiment 1.

Note that an acquisition method of the orientation correction values kax, kbx, kyx, and kby is not limited to the above method. For example, a neural network which receives three pieces of information which are the current line-of-sight information, the head orientation information acquired during the calibration operation, and the head orientation information acquired in Step S806 as inputs, and outputs the orientation correction values kax, kbx, kyx, and kby may also be used. FIG. 11 is a view showing an example of such a neural network (fully-connected feed-forward neural network). In learning of the neural network, for example, an error back propagation method is used, and a parameter of the neural network is updated by using a difference between an viewed point on an imaging surface and the center position of a target (a target object which is an object closest to the viewed point) as an error. In the case where the size of the target object is larger than a predetermined size, there are cases where it is not possible to estimate the viewed point with high accuracy (it is not possible to estimate part of the target object at which the user looks with high accuracy), and hence it is not necessary to update the parameter of the neural network. In order to reduce a computational burden of the camera 1, learning may be performed in another apparatus in advance and a computing unit which performs only inference using a learned parameter may be installed in the camera 1.

In addition, as the line-of-sight information, the rotation angles θx and θy calculated in Step S805 may also be used. Further, in the case where a difference between the head orientation during the calibration operation and the current head orientation is less than a predetermined threshold value, kax=0, kbx=1, kay=0, and kby=1 may be set such that the line-of-sight correction values Ax, Ay, Bx, and By are not corrected (changed).

The description will return to FIG. 8. In Step S808, the CPU 3 corrects the line-of-sight correction values Ax, Ay, Bx, and By using the orientation correction values kax, kbx, kay, and kby acquired in Step S807. Line-of-sight correction values after the correction Ax', Ay', Bx', and By' are calculated by using the following Formulas 8-1 to 8-4.

$$Ax' = kax + Ax \quad \text{(Formula 8-1)}$$

$$Bx' = kbx \times Bx \quad \text{(Formula 8-2)}$$

$$Ay' = kay + Ay \quad \text{(Formula 8-3)}$$

$$By' = kby \times By \quad \text{(Formula 8-4)}$$

In Step S809, the CPU 3 determines (estimates) the viewed point of the user on the screen of the display device 10 by using the rotation angles θx and θy calculated in Step S805 and the line-of-sight correction values Ax', Ay', Bx', and By' obtained in Step S808. When it is assumed that coordinates (Hx, Hy) of the viewed point are coordinates corresponding to the pupil center c, the coordinates (Hx, Hy) of the viewed point can be calculated by the following Formulas 9-1 and 9-2.

$$Hx = m \times (Ax' \times \theta x + Bx') \quad \text{(Formula 9-1)}$$

$$Hy = m \times (Ay' \times \theta y + By') \quad \text{(Formula 9-2)}$$

A coefficient m of each of Formulas 9-1 and 9-2 is a constant determined by the configuration of a viewfinder optical system of the camera 1 (the light receiving lens 16 and the like), and is a conversion coefficient for converting the rotation angles θx and θy to coordinates corresponding to the pupil center c on the screen of the display device 10. It is assumed that the coefficient m is predetermined and stored in the memory unit 4.

In Step S810, the CPU 3 stores the coordinates (Hx, Hy) of the viewed point in the memory unit 4, and ends the line-of-sight detection operation.

Explanation of Camera Operation

The operation of the camera 1 (the camera operation including a photographing operation) will be described by using a flowchart in FIG. 12.

When the power of the camera 1 is turned ON, in Step S1201, the imaging element 2 starts acquisition of a through image and transmits an image signal of the through image to the CPU 3, and the CPU 3 displays the acquired through image in the display device 10. The user performs confirmation of an object by viewing the through image displayed in the display device 10. The power of the camera 1 is turned ON/OFF according to a user operation to the camera 1.

Figure 12:
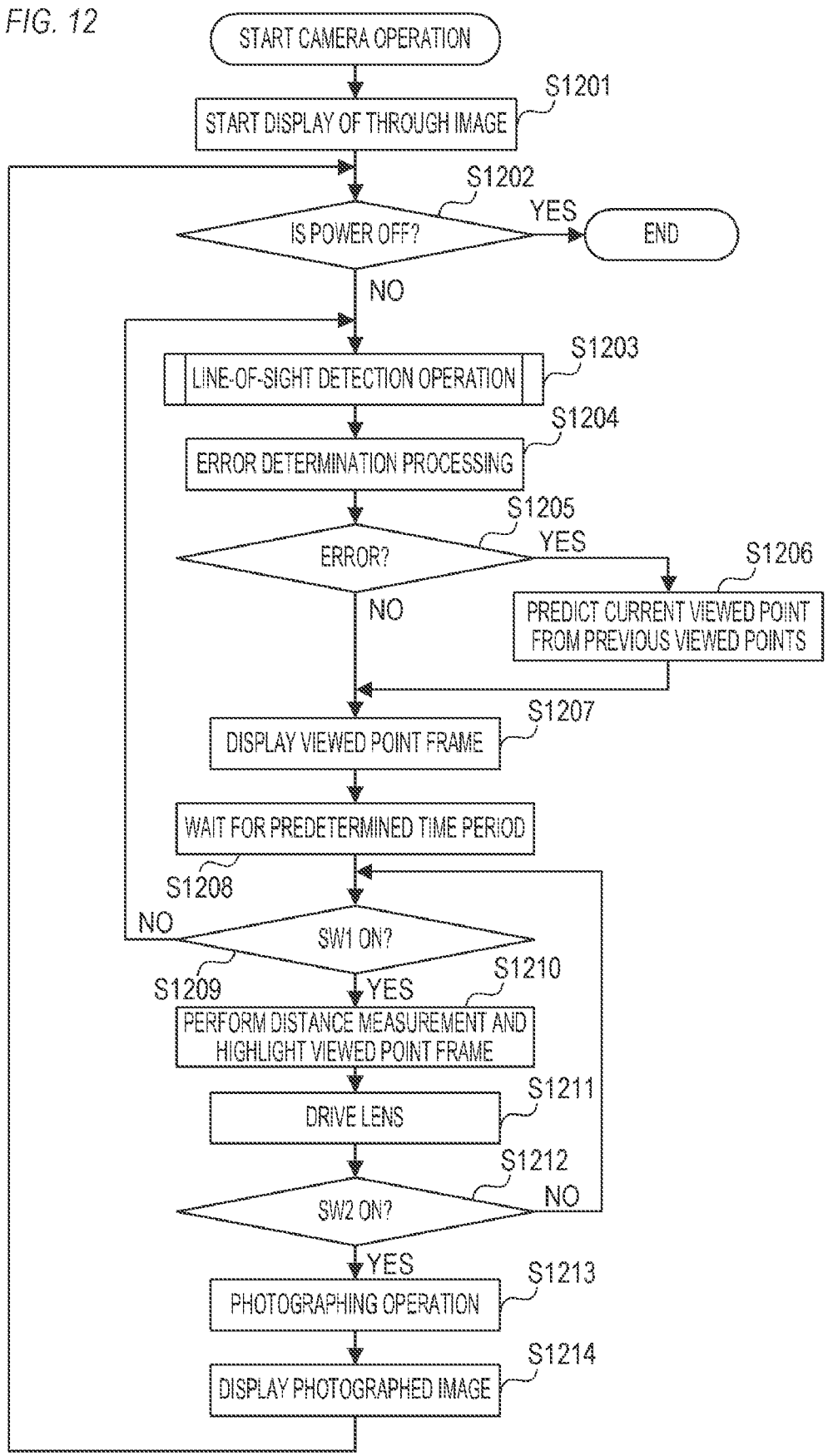
FIG. 12 is a flowchart of a camera operation according to Embodiment 1.

In Step S1202, the CPU 3 determines whether or not the power of the camera 1 is to be turned OFF, and the CPU 3 ends the camera operation in FIG. 12 in the case where the camera 1 is to be turned OFF, and advances processing to Step S1203 in the case where the camera 1 is not to be turned OFF.

In Step S1203, the CPU 3 starts acquisition of the eye image of the user who has started to visually recognize the through image in Step S1201, and performs the line-of-sight detection operation in FIG. 8. With the line-of-sight detection operation, the coordinates of the viewed point on the screen of the display device 10 are calculated.

In Step S1204, similarly to Step S505 in FIG. 5, the CPU 3 performs the predetermined error determination processing.

In Step S1205, the CPU 3 determines whether or not the line-of-sight detection operation (the current line-of-sight detection operation) in Step S1203 has failed according to the result of the error determination processing in Step S1204. Subsequently, the CPU 3 advances the processing to Step S1206 in the case where the line-of-sight detection operation has failed (the error has occurred in the line-of-sight detection operation), and the CPU 3 advances the processing to Step S1207 in the case where the line-of-sight detection operation has succeeded (the error has not occurred in the line-of-sight detection operation).

In Step S1206, the CPU 3 predicts the current viewed point from a plurality of viewed points calculated during a previous predetermined time period. In the case where the processing step in Step S1206 is performed, it follows that not the viewed point calculated in Step S1203 but the viewed point predicted in Step S1206 is used as the current viewed point. Note that a prediction method of the viewed point is not particularly limited. For example, it is possible to predict the current viewed point based on a movement amount or a movement direction of a previous viewed point. In the case where the viewed point is moved, it is possible to predict the current viewed point such that the path of the viewed point is smoothly extended. In the case where the viewed point is substantially stopped at one point (the case where the viewed point swings about one point or the like), it is possible to predict the center position or the average position of a plurality of viewed points as the current viewed point.

In Step S1207, the CPU 3 superimposes an viewed point frame on a position corresponding to the current viewed point (estimated position) in the through image such that the viewed point frame (a frame indicative of the viewed point) is displayed at the current viewed point (estimated position) on the screen of the display device 10. With this, display shown in FIG. 4A (display in which the viewed point frame is superimposed on the through image) is performed, and it is possible to inform the user of the current viewed point A (estimated position). A point indicative of the viewed point or the like may also be displayed instead of the viewed point frame.

In Step S1208, the CPU 3 performs wait of a predetermined time period.

In Step S1209, the CPU 3 determines whether or not the release button 5 is pressed (pressed halfway down) by the user and the switch SW1 is turned ON. For example, in the case where the user agrees with focus at the position of the viewed point frame (the frame indicative of the estimated viewed point) displayed to be superimposed on the through image, the user presses the release button 5 halfway down, and turns ON the switch SW1. The CPU 3 advances the processing to Step S1210 in the case where the switch SW1 is turned ON, and the CPU 3 returns the processing to Step S1203 in the case where the switch SW1 is not turned ON, and performs re-estimation of the viewed point.

In Step S1210, the CPU 3 performs a distance-measuring operation at the position of the current viewed point frame, and notifies the user of the execution of the distance-measuring operation by highlighting such as changing of the color of the viewed point frame.

In Step S1211, the CPU 3 drives the lens 101 in the photographing lens unit 1A according to the result of the distance measurement obtained in Step S1210. With this, the focus at the position of the viewed point frame displayed to be superimposed on the through image is implemented.

In Step S1212, the CPU 3 determines whether or not the release button 5 is further pressed down (all the way down) by the user and the switch SW2 is turned ON. For example, in the case where the user agrees with photographing at the current focus position, the user presses the release button 5 all the way down and turns ON the switch SW2. The CPU 3 advances the processing to Step S1213 in the case where the switch SW2 is turned ON, and the CPU 3 returns the processing to Step S1209 in the case where the switch SW2 is not turned ON.

In Step S1213, the CPU 3 stores an image signal obtained by the imaging element 2 by performing the photographing operation in the memory unit 4.

In Step S1214, the CPU 3 displays an image (photographed image) stored in the memory unit 4 in Step S1213 in the display device 10 for a predetermined time period, and returns the processing to Step S1202.

Specific Example of Operation

A specific example of the operation of the camera 1 will be described. Herein, an artificial head model provided with an artificial eyeball (false eyeball) is used. First, calibration is performed in a state in which the head model has a first orientation. Only the orientation of the artificial eyeball is changed during the calibration. If the line-of-sight correction value obtained by the calibration is used, it is possible to accurately estimate the viewed point when the head model has the first orientation. Next, an viewed point is estimated by determining the line-of-sight direction of the artificial eyeball such that the artificial eyeball looks at a predetermined position without changing the orientation of the head model from the first orientation. This viewed point is described as a first viewed point. Subsequently, the orientation of the head model is changed from the first orientation to a second orientation, and an viewed point is acquired by determining the line-of-sight direction of the artificial eyeball such that the artificial eyeball looks at the above predetermined position. This viewed point is described as a second viewed point. While a clear difference occurs between the first viewed point and the second viewed point in the case where the present disclosure is not applied, according to Embodiment 1 to which the present disclosure is applied, the first viewed point and the second viewed point substantially match each other.

Summary

As has been described thus far, according to Embodiment 1, the line-of-sight correction value is corrected based on the current line-of-sight information, the head orientation during the calibration, and the current head orientation. With this, it is possible to suppress a reduction in the accuracy of the line-of-sight detection caused by change of the use state of the line-of-sight detection apparatus. For example, it is possible to suppress a reduction in the accuracy of the line-of-sight detection caused by re-looking into the viewfinder and the movement of the apparatus, and it is possible to obtain the high-accuracy line-of-sight detection result. Furthermore, it is possible to perform processing (focus adjustment or the like) corresponding to the line-of-sight detection result according to the intention of the user.

Embodiment 2

Embodiment 2 of the present disclosure will be described. In Embodiment 1, the description has been given of the example in the case where the present disclosure is applied to the imaging apparatus. In Embodiment 2, a description will be given of an example in the case where the present disclosure is applied to a wearable device such as VR equipment or AR equipment which is mounted to the head of the user. The wearable device is, e.g., a head-mounted display or eyeglass-type electronic equipment.

Explanation of Configuration

Figure 13A:
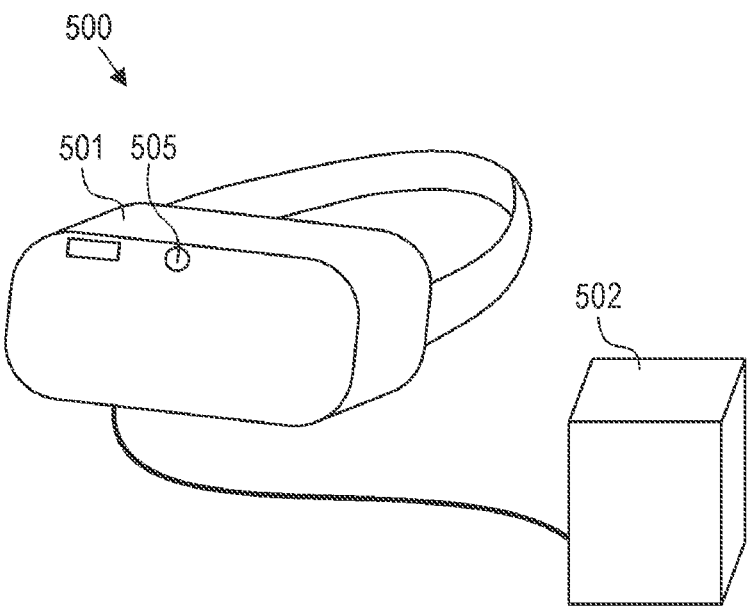
FIGS. 13A and 13B are external views of a head-mounted display according to Embodiment 2.
Figure 13B:
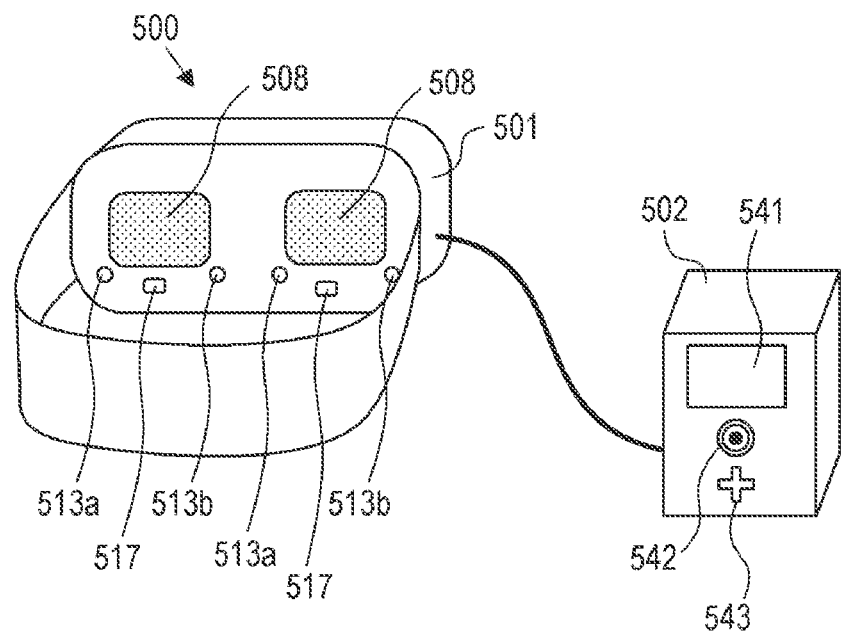

Each of FIGS. 13A and 13B shows the exterior of a head-mounted display (TIMID) 500 according to Embodiment 2. FIG. 13A is a front perspective view, and FIG. 13B is a rear perspective view. As shown in FIG. 13A, the HMD 500 has a head-mounted unit 501 and a controller 502, and the head-mounted unit 501 has a photographing lens 505 for imaging the outside world. In addition, as shown in FIG. 13B, the head-mounted unit 501 has a display unit 508, light sources 513a and 513b, and an eye imaging element 517 as components for each of the right eye and the left eye. The controller 502 has operation members 541 to 543 which receive various operations from the user. The HMD 500 may or may not be a video transmission type HMD (an HMD which images the outside world and displays a picture of the outside world substantially in real time). The HMD 500 may be an HMD which performs VR (virtual reality) display (display of virtual space such as display of a photographed (recorded) image or display of a game picture), and may also be an HMD which performs AR (augmented reality) display (superimposition display of information and a virtual object on real space).

The display unit 508 corresponds to the display device 10 in Embodiment 1, and displays an image in which the outside world is imaged, and various images (a movie and a game picture) acquired from a storage unit or a network which is not shown. The display unit 508 may display information related to an object at which the user looks as a UI. The light sources 513a and 513b correspond to the light sources 13a to 13d in Embodiment 1, and illuminate the eyeball of the user. Part of light emitted from the light sources 513a and 513b and reflected at the eyeball is collected at the eye imaging element 517. The eye imaging element 517 corresponds to the eye imaging element 17 in Embodiment 1, and images the eye of the user. The operation members 541 to 543 correspond to the operation members 41 to 43 in Embodiment 1, respectively. The user can perform various operations by using the operation members 541 to 543, and can finely adjust, e.g., the position of the UI (marks or the like) displayed in the display unit 508 from the controller 502.

Figure 14:
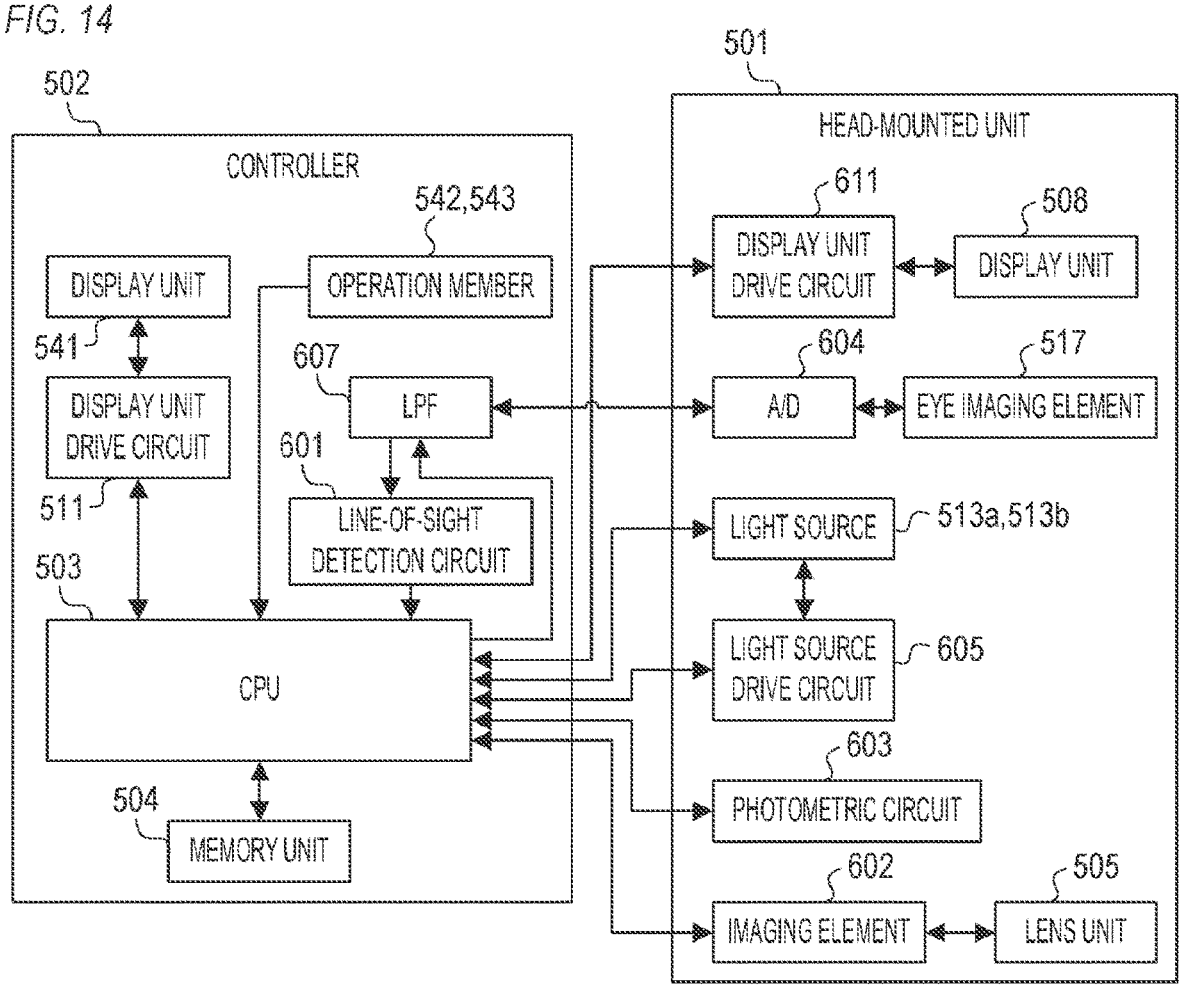
FIG. 14 is a block diagram of the head-mounted display according to Embodiment 2.

FIG. 14 is a block diagram showing an electrical configuration of the HMID 500. The controller 502 has a CPU 503, a memory unit 504, a line-of-sight detection circuit 601, an LPF 607, a display unit drive circuit 511, the operation member 541 (display unit), and the operation members 542 and 543. As described above, the head-mounted unit 501 has the photographing lens 505, the display unit 508, the light sources 513a and 513b, and the eye imaging element 517. Further, the head-mounted unit 501 has an A/D conversion unit 604, an imaging element 602, a photometric circuit 603, a light source drive circuit 605, and a display unit drive circuit 611.

The CPU 503 corresponds to the CPU 3 in Embodiment 1. The CPU 503 is a central processing unit of a microcomputer, and controls the entire HMID 500. The memory unit 504 corresponds to the memory unit 4 in Embodiment 1, and has the function of storing an imaging signal from the eye imaging element 517 and the function of storing the line-of-sight correction value which corrects an individual difference of the line of sight. The memory unit 504 may have the function of storing a correction value for correcting reliability of information related to the left eye or reliability of information related to the right eye. The display unit drive circuit 511 drives the operation member 541 (display unit).

The imaging element 602 corresponds to the imaging element 2 in Embodiment 1, and is disposed on a planned image plane of the photographing lens 505. The photometric circuit 603 corresponds to the photometric circuit 202 in Embodiment 1. The photometric circuit 603 performs amplification, logarithmic compression, and A/D conversion on a signal obtained from the imaging element 602 which also plays the role of a photometric sensor, specifically, a brightness signal corresponding to luminosity of a field, and sends the result thereof to the CPU 503 as field brightness information. The light source drive circuit 605 corresponds to the light source drive circuit 205 in Embodiment 1, and drives the light sources 513a and 513b. The display unit drive circuit 611 corresponds to the display device drive circuit 11 in Embodiment 1, and drives the display unit 608.

The line-of-sight detection circuit 601 corresponds to the line-of-sight detection circuit 201 in Embodiment 1. The line-of-sight detection circuit 601 performs A/D conversion on an output (eye image) of the eye imaging element 517 in a state in which the eye image is formed on the eye imaging element 517 in the A/D conversion unit 604, and transmits the result thereof to the CPU 503 via the LPF 607. The CPU 503 extracts a feature point required for the line-of-sight detection from the eye image according to the same algorithm as that in Embodiment 1, and detects the line of sight of the user from the position of the feature point.

The calibration operation and the line-of-sight detection operation according to Embodiment 2 are the same as those in Embodiment 1. However, in Embodiment 2, the viewed point is detected based on a right eye image in which the right eye of the user is imaged and a left eye image in which the left eye of the user is imaged. The rotation angle of the right eye is calculated based on the right eye image, and the rotation angle of the left eye is calculated based on the left eye image. Subsequently, the viewed point of the right eye is estimated based on the rotation angle of the right eye, and the viewed point of the left eye is estimated based on the rotation angle of the left eye.

The head orientation is also detected based on the right eye image and the left eye image. For example, head orientation information (θYaw_R, θRoll_R, θPitch_R) is acquired based on the right eye image, and head orientation information (θYaw_L, θRoll_L, θPitch_L) is acquired based on the left eye image. Subsequently, final head orientation information (θYaw, θRoll, θPitch) in which the above two head orientation information pieces are combined is calculated by using the following Formulas 10-1 to 10-3. Coefficients kL and kR are weights for increasing an influence of the head orientation information based on an image of a dominant eye. Note that, in the case where one of the acquisition of the head orientation information based on the right eye image and the acquisition of the head orientation information based on the left eye image has failed, the head orientation information of which the acquisition has succeeded may be used as the final head orientation information.

$$\theta Yaw = (kL \times \theta Yaw\_L + kR \times \theta Yaw\_R)/2 \quad \text{(Formula 10-1)}$$

$$\theta Roll = (kL \times \theta Roll\_L + kR \times \theta Roll\_R)/2 \quad \text{(Formula 10-2)}$$

$$\theta Pitch = (kL \times \theta Pitch\_L + kR \times \theta Pitch\_R)/2 \quad \text{(Formula 10-3)}$$

By correcting the line-of-sight correction value similarly to Embodiment 1 by using the combined head orientation information, it is possible to suppress a reduction in the accuracy of the line-of-sight detection caused by the change of the use state of the line-of-sight detection apparatus.

Summary

As has been described thus far, according to Embodiment 2, similarly to Embodiment 1, it is possible to suppress a reduction in the accuracy of the line-of-sight detection caused by the change of the use state of the line-of-sight detection apparatus in the wearable device such as the head-mounted display.

Note that each of Embodiments 1 and 2 is only an example, and configurations obtained by appropriately modifying or changing the configurations in Embodiments 1 and 2 within the scope of the gist of the present disclosure are also included in the present disclosure. Configurations obtained by appropriately combining the configurations in Embodiments 1 and 2 are also included in the present disclosure.

According to the present disclosure, it is possible to suppress a reduction in the accuracy of the line-of-sight detection caused by the change of the use state of the line-of-sight detection apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-201724, filed on Dec. 13, 2021, which is hereby incorporated by reference herein in its entirety.

What is claimed is:

1. A gaze detection apparatus comprising at least one memory and at least one processor which function as:
   a gaze detection unit configured to detect, based on an eye image in which an eye of a user is imaged, a gaze position which is a position at which the user looks;
   an orientation detection unit configured to detect a head orientation which is an orientation of a head of the user, based on the eye image;
   a calibration unit configured to acquire a first correction value for reducing a detection error of the gaze position by a predetermined calibration operation; and
   a correction unit configured to correct the first correction value, based on gaze information related to a current gaze position, a head orientation during the predetermined calibration operation, and a current head orientation.

2. The gaze detection apparatus according to claim 1, wherein
   the at least one memory and the at least one processor further function as: an acquisition unit configured to acquire a second correction value, based on the gaze information related to the current gaze position, the head orientation during the predetermined calibration operation, and the current head orientation, and
   the correction unit corrects the first correction value by using the second correction value.

3. The gaze detection apparatus according to claim 2, wherein the acquisition unit is a computation unit using a neural network which receives, as inputs, the gaze information related to the current gaze position, first orientation information related to the head orientation during the predetermined calibration operation, and second orientation information related to the current head orientation, and outputs the second correction value.

4. The gaze detection apparatus according to claim 3, wherein the at least one memory and the at least one processor further function as: an update unit configured to update a parameter of the neural network by using a difference between the gaze position and a center position of a target object, which is an object closest to the gaze position, as an error.

5. The gaze detection apparatus according to claim 4, wherein the update unit does not update the parameter of the neural network in a case where a size of the target object is larger than a predetermined size.

6. The gaze detection apparatus according to claim 1, wherein the correction unit does not correct the first correction value in a case where a difference between the head orientation during the predetermined calibration operation and the current head orientation is less than a predetermined value.

7. The gaze detection apparatus according to claim 1, wherein
the gaze detection unit detects the gaze position, based on a right eye image in which a right eye of the user is imaged and a left eye image in which a left eye of the user is imaged, and
the orientation detection unit detects the head orientation, based on the right eye image and the left eye image.

8. The gaze detection apparatus according to claim 1, wherein the gaze information is information on a center position of a pupil in the eye image, a center-of-gravity position of a plurality of corneal reflection images, and an interval between the plurality of corneal reflection images.

9. The gaze detection apparatus according to claim 1, wherein the gaze information is information on an angle of a gaze direction, which is a direction in which the user looks, with respect to an optical axis of imaging unit for imaging the eye of the user.

10. A gaze detection apparatus comprising at least one memory and at least one processor which function as:
a gaze detection unit configured to detect, based on an eye image in which an eye of a user is imaged, a gaze position which is a position at which the user looks; and
a calibration unit configured to acquire a correction value for reducing a detection error of the gaze position by a predetermined calibration operation, wherein
after the predetermined calibration operation is performed in a state in which a head of the user has a first orientation, a gaze position which is detected in a state in which the head of the user has the first orientation and the user looks at a predetermined position and a gaze position which is detected in a state in which the head of the user has a second orientation different from the first orientation and the user looks at the predetermined position substantially match each other.

11. A control method of a gaze detection apparatus, comprising:
detecting, based on an eye image in which an eye of a user is imaged, a gaze position which is a position at which the user looks;
detecting a head orientation which is an orientation of a head of the user, based on the eye image;
acquiring a first correction value for reducing a detection error of the gaze position by a predetermined calibration operation; and
correcting the first correction value, based on gaze information related to a current gaze position, a head orientation during the predetermined calibration operation, and a current head orientation.

12. A non-transitory computer readable medium that stores a program, wherein the program causes a computer to execute a control method of a gaze detection apparatus, the control method comprising:
detecting, based on an eye image in which an eye of a user is imaged, a gaze position which is a position at which the user looks;
detecting a head orientation which is an orientation of a head of the user, based on the eye image;
acquiring a first correction value for reducing a detection error of the gaze position by a predetermined calibration operation; and
correcting the first correction value, based on gaze information related to a current gaze position, a head orientation during the predetermined calibration operation, and a current head orientation.

* * * * *